(12) United States Patent
Gomard et al.

(10) Patent No.: US 12,319,000 B2
(45) Date of Patent: Jun. 3, 2025

(54) 3D PRINTING APPARATUS AND 3D PRINTING METHOD FOR MANUFACTURING A WORKPIECE

(71) Applicant: Carl Zeiss Vision International GmbH, Aalen (DE)

(72) Inventors: Guillaume Gomard, Mannheim (DE); Bernd Borrmann, Zoellnitz (DE); Matthias Hillenbrand, Jena (DE); Michael Totzeck, Schwaebisch Gmuend (DE); Roman Zvahelskyi, Karlsruhe (DE); Marc Frederik Mayer, Karlsruhe (DE); Martin Wegener, Karlsruhe (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/820,596

(22) Filed: Aug. 30, 2024

(65) Prior Publication Data
US 2024/0416586 A1    Dec. 19, 2024

Related U.S. Application Data
(63) Continuation of application No. PCT/EP2023/052469, filed on Feb. 1, 2023.

(51) Int. Cl.
*B29C 64/277* (2017.01)
*B29C 64/135* (2017.01)
(Continued)

(52) U.S. Cl.
CPC .......... *B29C 64/277* (2017.08); *B29C 64/135* (2017.08); *B29C 64/268* (2017.08);
(Continued)

(58) Field of Classification Search
CPC ... B29C 64/277; B29C 64/386; B29C 64/135; B29C 64/268; B33Y 10/00; B33Y 30/00; B33Y 50/00
See application file for complete search history.

(56) References Cited

U.S. PATENT DOCUMENTS

| 10,649,439 B2 | 5/2020 | Wang et al. |
| 11,122,978 B1 | 9/2021 | Haji Reza et al. |

(Continued)

FOREIGN PATENT DOCUMENTS

| CN | 105479751 A | 4/2016 |
| CN | 107408789 A | 11/2017 |

(Continued)

OTHER PUBLICATIONS

Baldacchini et al., "Characterization of Microstructures Fabricated by Two-Photon Polymerization Using Coherent Anti-Stokes Raman Scattering Microscopy," The Journal of Physical Chmistry B, vol. 113, Issue 38, pp. 12663 to 12668, Aug. 31, 2009.
(Continued)

*Primary Examiner* — Monica A Huson
(74) *Attorney, Agent, or Firm* — Tautz & Schuhmacher LLC; Georg Hasselmann

(57) ABSTRACT

A 3D printing apparatus for manufacturing a workpiece has a first radiation source to carry out a non-linear absorption polymerization and a second radiation source to carry out optical coherence tomography. A first beam path is traversed by the first radiation and a second beam path is traversed by the second radiation. The first and second beam paths are formed completely independently of one another. Further, a 3D printing method for manufacturing a workpiece, another 3D printing apparatus, and methods for analyzing the quality of a raw material of a non-linear absorption polymerization; checking an orientation of a substrate to be printed by non-linear absorption polymerization; determining a spa-
(Continued)

tially resolved degree of conversion of a non-linear absorption polymerization; analyzing a structural sharpness of a structure produced by non-linear absorption polymerization; and for three-dimensional reconstruction of a workpiece manufactured by non-linear absorption polymerization are disclosed.

14 Claims, 9 Drawing Sheets

(51) Int. Cl.
  *B29C 64/268* (2017.01)
  *B29C 64/386* (2017.01)
  *B33Y 10/00* (2015.01)
  *B33Y 30/00* (2015.01)
  *B33Y 50/00* (2015.01)

(52) U.S. Cl.
  CPC ............ *B29C 64/386* (2017.08); *B33Y 10/00* (2014.12); *B33Y 30/00* (2014.12); *B33Y 50/00* (2014.12)

(56) References Cited

U.S. PATENT DOCUMENTS

| | | | |
|---|---|---|---|
| 2016/0023403 | A1 | 1/2016 | Ramos et al. |
| 2016/0161731 | A1 | 6/2016 | Brueck et al. |
| 2017/0361405 | A1 | 12/2017 | Renz et al. |
| 2019/0163067 | A1 | 5/2019 | Koos et al. |

FOREIGN PATENT DOCUMENTS

| | | | |
|---|---|---|---|
| WO | 2011/136919 | A1 | 11/2011 |
| WO | 2019/006409 | A1 | 1/2019 |
| WO | 2020/150251 | A1 | 7/2020 |

OTHER PUBLICATIONS

Jiang et al., "Two-photon polymerization: investigation of chemical and mechanical properties of resins using Raman microspectroscopy," Optics Letters, vol. 39, No. 10, pp. 3034 to 3037, May 15, 2014.
Gissibl et al., "Sub-micrometre accurate free-form optics by three-dimensional printing on single-mode fibres," Nature Communications, vol. 7, Art. 11763, pp. 1 to 9, Jan. 24, 2016.
LaFratta et al., "Two-Photon Polymerization Metrology: Characterization Methods of Mechanisms and Microstructures," Micromachines, vol. 8, Issue 4, No. 101, pp. 1 to 25, Mar. 27, 2017.
Saha et al., "Effect of Proximity of Features on the Damage Threshold during submicron Additive Manufacturing via Two-Photon Polymerization," Journal of Micro and Nano-Manufacturing, vol. 5, Issue 3, Art. 031002, pp. 1 to 10, Sep. 2017.
Prince et al., "Visualizing TPP structures with coherent Raman scattering microscopy," Three-Dimensional Microfabrication Using Two-Photon Polymerization (Second Edition), Chapter 3.3, William Andrew Publishing, pp. 229 to 249, Jan. 1, 2019.
Rys et al., "Locally addressable material properties in 3D micro-architectures," Extreme Mechanics Letters, vol. 28, pp. 31 to 36, Apr. 2019.
Alsharhan et al., "3D Microfluidics via Cyclic Olefin Polymer-Based In-Situ Direct Laser Writing," Lab on a Chip, Issue 17, pp. 2799 to 2810, Jul. 16, 2019.
Lamont et al., "A facile multi-material direct laser writing strategy," Lab on a Chip, Issue 19, No. 14, pp. 2340 to 2345, Jul. 21, 2019.
Dong et al., "Visualizing curing process inside polymers," Applied Physics Letters, vol. 116, Issue 5, Art. 054103, pp. 1 to 5, Feb. 4, 2020.
Jayne et al., "Direct laser writing for cardiac tissue engineering: a microfluidic heart on a chip with integrated transducers," Lab on a Chip, Issue 21, pp. 1724 to 1737, Mar. 18, 2021.
Tashman et al., "In Situ Volumetric Imaging and Analysis of FRESH 3D Bioprinted Constructs Using Optical Coherence Tomography," Biofabrication, vol. 15, No. 1, Art. 014102, pp. 1 to 51, Jul. 1, 2021.
Yang et al., "In situ process monitoring and automated multi-parameter evaluation using optical coherence tomography during extrusion-based bioprinting," Additive Manufacturing, vol. 47, Art. 102251, pp. 1 to 11, Nov. 2021.
German Search Report issued in DE 10 2022 104 797.0 , to which this application claims priority, mailed Sep. 16, 2022 (English-language machine translation attached).
International Search Report and Written Opinion issued in PCT/EP2023/052469, to which this application claims priority, mailed May 22, 2023 (English-language machine translation attached).
International Preliminary Report on Patentability issued in PCT/EP2023/052469, to which this application claims priority, mailed Aug. 30, 2024.
Hahn et al., "Two-step absorption instead of two-photon absorption in 3D nanoprinting," Nature Photonics, vol. 15, pp. 932 to 938, Nov. 29, 2021.
Li et al., "Two-photon polymerisation 3D printed freeform micro-optics for optical coherence tomography fibre probes," Scientific Reports, vol. 8, pp. 1 to 9, Oct. 4, 2018.
Jianrong et al., "Probes for Endoscopic Optical Coherence Tomography: Minimized Design and Depth of Focus Extension," Chinese Journal of Lasers, vol. 47, No. 2, Feb. 2020, relevance is found in the English-language abstract.
Office Action by the Chinese Patent Office (SIPO) issued in Cn 202380025017.X, which is a counterpart hereof, mailed on Feb. 8, 2025, and English translation thereof.

3D PRINTING APPARATUS AND 3D PRINTING METHOD FOR MANUFACTURING A WORKPIECE

CROSS REFERENCE TO RELATED APPLICATIONS

This application is a continuation application of international patent application PCT/EP2023/052469, filed on Feb. 1, 2023 and designating the U.S., which claims priority to German patent application 10 2022 104 797.0, filed on Mar. 1, 2022, all of which are hereby incorporated by reference in their entireties.

TECHNICAL FIELD

The disclosure relates to 3D printing apparatuses and to 3D printing methods for manufacture of a workpiece. The disclosure further relates to a method of analysis of a quality of a starting material for a nonlinear absorption polymerization, to a method of verifying the position and/or alignment of a substrate to be printed by nonlinear absorption polymerization, to a method of ascertaining a spatially resolved degree of conversion of a nonlinear absorption polymerization, to a method of analyzing a structure sharpness of a structure created by nonlinear absorption polymerization, and to a method of three-dimensional reconstruction of a workpiece manufactured by nonlinear absorption polymerization.

BACKGROUND

Nonlinear absorption polymerization is an additive manufacturing method (3D printing method) in which a three-dimensional workpiece is constructed layer by layer by controlled polymerization of a starting material with monomers and/or oligomers. The starting material may also be referred to as a photoresist.

Irradiation with photons, which are typically emitted by means of a laser, causes the breakdown of a photoinitiator into free radicals that bring about free-radical polymerization of the monomers and/or oligomers to produce a polymer. Subsequently, it is possible to remove non-polymerized monomers and/or oligomers, for example to wash them out, so as to obtain the desired workpiece composed of polymer material. This wash step is also referred to as developing of the photoresist. By means of subsequent chemical processes, it is possible to modify or transform the polymer material if required.

Lasers used are typically femtosecond lasers, i.e., lasers having pulses of light with a duration in the femtosecond range. By contrast with photopolymerization, which has already been known for some time, nonlinear absorption polymerization enables the creation of very small structure sizes in the region of about 100 nm. The reason for this is that free radical formation requires multiple, for example two, photons to be absorbed in a nonlinear manner, which is possible only at that position or in that reaction volume where the energy input is sufficiently high, i.e., in the immediate focus region of the laser. The power introduced is proportional here to (optical intensity)$^N$, where $N=1$ for linear mechanisms and $N>1$ for nonlinear mechanisms.

By appropriate control of the laser focus in lateral direction and along the depth axis, it is consequently possible to accurately fix the site of the polymerization reaction, such that the desired three-dimensional workpiece can be formed step by step. The corresponding method is also referred to as direct laser writing (abbreviated to "DLW").

Two significant subgroups of nonlinear absorption polymerization are two-photon polymerization and two-stage absorption polymerization. While two-photon polymerization is based on simultaneous absorption of two photons, absorption in two-stage absorption polymerization proceeds in two successive stages, as described in HAHN, V., MESSER, T., BOJANOWSKI, N. M., CURTICEAN, E. R., WACKER, I., SCHRÖDER, R. R., BLASCO, E., WEGENER, M. "Two-step absorption instead of two-photon absorption in 3D nanoprinting," Nat. Photon., 2021 15, 932-938. The basic idea of two-stage absorption is to replace the virtual state in two-photon absorption with a real state, i.e., with an electronic intermediate state that exists without the light field. The lifetime thereof is generally determined by nonradiative processes and may be longer than femto- or picoseconds by a number of orders of magnitude. Unless stated otherwise, the term "nonlinear absorption polymerization" is used here as an umbrella term for two-photon polymerization and two-stage absorption polymerization.

Several challenges are associated with the practical use of nonlinear absorption polymerization, which are set out hereinafter.

Impurities in the starting material can impair the quality of the printed structures and hence of the manufactured workpiece. For example, impurities can lead the formation of unwanted light scattering centers in the path of the radiation that is to bring about the nonlinear absorption polymerization, for example in the path of a femtosecond (fs) laser beam. Alternatively or additionally, impurities can bring about local inhomogeneities within the voxels at the focus of the radiation, for example at the laser focus. This in turn can lead to undesirably high surface roughnesses, variances in shape in relation to the desired 3D model, and/or to local inhomogeneities, for example in the optical properties, such as the refractive index, or in the mechanical properties of the printed material and hence of the workpiece manufactured.

Possible impurities may be either extrinsic particles, e.g., dust particles, or intrinsic inhomogeneities that form within the starting material over time.

There is therefore a need to discover a method by which impurities can be analyzed in the starting material.

While, in some applications, a single element is printed onto a plane and horizontally aligned substrate, it is necessary in other applications, for example, to print a structure:
  onto a freeform surface,
  onto side walls, for example the edge of a substrate, as described in JAYNE, R. K., KARAKAN, M. Ç., ZHANG, K., PIERCE, N., MICHAS, C., BISHOP, D. J., CHEN, C. S., EKINCI, K. L., WHITE, A. E. Direct laser writing for cardiac tissue engineering: a microfluidic heart on a chip with integrated transducers. Lab Chip, 2021, 21 (9), 1724-1737,
  onto the tip of an optical fiber, described, for example, in GISSIBL, T., THIELE, S., HERKOMMER, A., GIESSEN, H. Sub-micrometre accurate free-form optics by three-dimensional printing on single-mode fibres. Nat Commun, 2016, 7, 11763,
  into semiclosed cavities or other regions that are difficult to access, for example in order to functionalize a microfluidic channel, ALSHARHAN, A. T., ACEVEDO, R., WARREN, R., SOCHOL, R. D. 3D microfluidics via cyclic olefin polymer-based in situ direct laser writing. Lab Chip, 2019, 19 (17), 2799-2810), or alongside and in already existing parts produced by nonlinear absorption polymerization or in some other way (LAMONT, A. C., RESTAINO, M. A., KIM, M. J., SOCHOL, R. D. A facile multi-material direct laser writing strategy. Lab Chip, 2019, 19 (14), 2340-2345), which can be identified solely via their refractive index or via volumetric information, for example sequential printing of similar parts with alternating photoresists.

Also possible is a combination of the abovementioned requirements. In these cases, the initial positioning and/or alignment of the substrate can be difficult even if alignment marks are used or if a single real-time camera (live view camera) is used in the 3D printer.

There is therefore a need to discover a method by which the positioning and/or alignment of a substrate to be printed can be improved.

It is known that many properties of the polymer formed depend on the local degree of conversion (abbreviated to "DC"). The degree of conversion can be defined here as the percentage by mass of the starting material (monomers and/or oligomers) that have been covalently bonded to one another to form the product (polymer). The determination and control of the degree of conversion is of crucial importance since this parameter affects the mechanical properties, for example the modulus of elasticity, the optical properties, for example refractive index, and/or the thermal properties, e.g., thermal expansion, of the workpiece produced. The adjustment of the degree of conversion on the micrometer scale or even below that additionally enables the production of, for example, gradient refractive index optics (abbreviated to "GRIN") and mechanical parts having specific gradients in modulus of elasticity and stiffness.

The local degree of conversion depends on the locally employed power of the radiation source, i.e., for example, the laser power, and the local exposure time during 3D printing. Therefore, by the measurement of the local refractive index, it is possible to infer information about the degree of conversion. If the degree of conversion of test samples is analyzed ex situ, for example by means of spectroscopic ellipsometry, the optimization of the radiation power employed and of the exposure time may be very time-consuming.

There is therefore a need to discover an improved method by which the degree of conversion can be ascertained. It would be desirable for in situ analysis of the degree of conversion to be possible.

Moreover, it would be helpful to be able to determine the degree of conversion within the printed photoresist in a spatially resolved manner since the degree of conversion can vary intentionally or unintentionally in the micrometer range or below that.

Immediately after 3D printing, the diffusion of monomers into an interfacial layer between the unpolymerized and the exposed starting material can impair the structure sharpness of the printed workpiece. The degree and the time dependence of this diffusion process depend in particular on the type of starting material used and on the parameters of the nonlinear absorption polymerization, for example the laser writing parameters. Without an in situ method of monitoring, it is possible to analyze the consequences of monomer diffusion only after excess starting material has been washed out, i.e., after the development of the photoresist, which is disadvantageous particularly in the case of long print applications.

What would therefore be desirable would be a method that enables an in situ analysis of the structure sharpness, i.e., an analysis even while the print operation is still running.

Impurities in the starting material, shrinkage of the polymerized starting material, proximity effects and nonoptimized laser writing parameters are examples of factors that can cause the actual morphology of a printed workpiece to vary from its target model, e.g., a CAD model (CAD=computer-aided design). Proximity effects here mean effects caused by the presence of already printed or polymerized structures in the immediate environment. These include a reduction in the minimum radiation dose required for polymerization, which can lead to distortion of fine structures owing to a spatially more poorly confined polymerization reaction, and a reduction in the radiation dose above which damage to already existing adjacent structures may arise, as, for example, in SAHA, S. K., DIVIN, C. CUADRA, J. A., PANAS, R. M. "Effect of Proximity of Features on the Damage Threshold during submicron Additive Manufacturing via Two-Photon Polymerization," J. Micro Nano-Manuf., September 2017, 5(3): 031002.

3D reconstruction of the actual morphology by in situ measurements with optical coherence tomography has already been reported, for example, in TASHMAN, J. W., SHIWARSKI, D. J., RUESCH, A., LANNI, F., KAINER-STORFER, J., FEINBERG, A. W. "In Situ Volumetric Imaging and Analysis of FRESH 3D Bioprinted Constructs Using Optical Coherence Tomography," bioRxiv, 2021, (available at the url: doi.org/10.1101/2021.06.30.450389) and WO 2020/150 251 A1. However, the approaches described in these two documents are based on imperfections within the printed regions that lead to an optical coherence tomography signal in ideally homogeneous regions. Without these imperfections, it would be impossible to reconstruct particular morphologies after the printing operation has ended.

What would therefore be desirable is a method by which the aforementioned disadvantages can be avoided and which enables 3D reconstruction even without the presence of imperfections.

The related art discloses a multitude of methods of characterization both of workpieces produced by two-photon polymerization and of two-photon polymerization processes.

An overview of ex situ and in situ metrology solutions that enable the inspection of microstructures created by two-photon polymerization can be found in LAFRATTA, C. N., BALDACCHINI, T. "Two-photon polymerization metrology: Characterization methods of mechanisms and microstructures," Micromachines, 2017, 8(4), 101. The methods presented serve in particular for analysis of the structure sizes of the laser-written materials, for example by ex situ scanning electron microscopy, of the surface roughness thereof, for example by ex situ atomic force microscopy, of the variance in shape thereof with respect to the target 3D model as a result of the shrinkage in the photopolymerization or photoresist development, and of the degree of conversion thereof.

A standard method for extrapolation of the degree of conversion is differential scanning calorimetry (abbreviated to "DSC"). However, it is not suitable for workpieces that are produced by nonlinear absorption polymerization since it requires a minimum weight, cannot be conducted in situ and is associated at least with damage to the sample to be examined. Fourier transformation infrared spectroscopy (abbreviated to "FTIR") can likewise be used to ascertain the degree of conversion, but in the case of nonlinear absorption polymerization is subject to multiple limitations, especially with regard to poor spatial resolution.

JIANG, L. J., ZHOU, Y. S., XIONG, W., GAO, Y., HUANG, X., JIANG, L., BALDACCHINI, T., SILVAIN, J.-F., LU, Y. F. "Two-photon polymerization: investigation of chemical and mechanical properties of resins using Raman microspectroscopy," Optics letters, 2014, 39 (10), 3034-3037, especially FIG. 3, and RYS, J., STEENHUSEN, S., SCHUMACHER, C., CRONAUER, C., DARAIO, C. "Locally addressable material properties in 3D micro-architectures," Extreme Mechanics Letters, 2019, 28, 31-36, especially FIG. 4, addresses the use of Raman (micro) spectroscopy for ascertaining and imaging the degree of conversion on the micrometer scale. The degree of conversion can be derived here from the integrated change in peak intensity of the C=C bonds, which are converted to C—C bonds in polymerization. Even though Raman (micro) spectroscopy enables nondestructive in situ examination, the employability thereof is hindered by a small signal-to-noise ratio requiring either high laser powers or long detection times. The detection times may be several hours for the imaging of printed parts having a size of several tens of micrometers, which is not reconcilable with real-time analysis during nonlinear absorption polymerization.

These limitations can be avoided by microscopy with coherent anti-Stokes Raman scatter (abbreviated to "CARS"), where the laser beam used for the production of the workpiece can also be used to generate the pump beam and Stokes beam for the CARS imaging. The signal intensity depends here on the concentration of the C—H bonds, which is in turn correlated with the density of the polymer created; see FIG. 3.3.8 in PRINCE, R., FAN, P., LU, Y., BALDACCHINI, T., POTMA, E. O. "Visualizing TPP structures with coherent Raman scattering microscopy," Three-Dimensional Microfabrication Using Two-Photon Polymerization, 2020, p. 229-249, William Andrew Publishing. However, the degree of conversion can be ascertained only indirectly by first retrieving the Raman spectrum with an algorithm for phase determination and then applying the above-described approach for Raman (micro)spectroscopy. Because of its detection rate in the order of magnitude of milli- to microseconds and its sample volume close to the size of the printed voxels, CARS has been mentioned as a possible in situ process monitoring method; see BALDACCHINI, T., ZIMMERLEY, M., KUO, C. H., POTMA, E. O., ZADOYAN, R. "Characterization of microstructures fabricated by two-photon polymerization using coherent anti-stokes Raman scattering microscopy," J. Phys. Chem. B, 2009, 113 (38), 12663-12668 and WO 2011/136 919 A1.

Finally, optical coherence tomography and quantitative phase imaging have been combined to visualize the time-resolved and spatially resolved degree of conversion on polymer droplets (DONG, B., PAN, B. "Visualizing curing process inside polymers," Appl. Phys. Lett., 2020, 116 (5), 054103). However, a prerequisite for this approach is that the backscattered light is collected from the volume of the polymer droplets, which can necessitate the introduction of additional light-scattering nanoparticles into the polymer medium.

Optical coherence tomography (abbreviated to "OCT") is an imaging method for creating and displaying high-resolution three-dimensional images, for example from the various depth layers of a sample. For this purpose, electromagnetic radiation, for example infrared radiation having a wavelength of about 800 to 1400 nm and having a low coherence length based on time, is divided in a beam divider into two beams or beam of rays, where one of the beams of rays is steered onto the sample to be examined and the other beam of rays serves as a reference and traverses a reference path. The beam of rays reflected by the sample is superimposed with the reference beam of rays. It is then possible to create an image from the resulting interference signal that shows the structures of the sample along the depth axis, wherein it is possible by lateral scanning across the sample to be analyzed to create three-dimensional optical coherence tomography images, i.e., OCT images, from the two-dimensional depth signals.

In order to perform optical coherence tomography, it is possible, for example, to use infrared radiation having a wavelength of about 800 nm to 1400 nm or else visible light having a wavelength between about 400 nm and 800 nm. It would also be possible in principle to use infrared radiation having a greater wavelength, for example of up to about 2 µm. The use of visible light has the advantage of higher spatial resolution, but the use of visible light can lead to problems with regard to unwanted absorption in the starting material.

OCT has already been proposed as an online monitoring system for general use in 3D printing methods and because of its nondestructive usability and its high penetration depth into materials with low absorption (U.S. Pat. No. 10,649,439 B2). One use related to the comparison of the actually printed structure with the design parameters of the model. This strategy was also followed in the bioprinting sector, in order to achieve in situ process monitoring by OCT in conjunction with a 3D extrusion bioprinter (YANG, S., WANG, L., CHEN, Q., XU, M. "In situ process monitoring and automated multi-parameter evaluation using optical coherence tomography during extrusion-based bioprinting," Additive Manufacturing 47, 102251, 2021; TASHMAN, J. W., SHIWARSKI, D. J., RUESCH, A., LANNI, F., KAINERSTORFER, J., FEINBERG, A. W. "In Situ Volumetric Imaging and Analysis of FRESH 3D Bioprinted Constructs Using Optical Coherence Tomography," bioRxiv, 2021, https://doi.org/10.1101/2021.06.30.450389). With the aid of measurement software, the variances in the 3D OCT reconstruction from the original 3D model became clearly visible (see FIG. S5 in TASHMAN, J. W., SHIWARSKI, D. J., RUESCH, A., LANNI, F., KAINERSTORFER, J., FEINBERG, A. W. "In Situ Volumetric Imaging and Analysis of FRESH 3D Bioprinted Constructs Using Optical Coherence Tomography," bioRxiv, 2021, https://doi.org/10.1101/2021.06.30.450389).

U.S. 2016/0023403 A1 describes the utilization of OCT as an image processing unit in order to monitor the conformity of the successively applied layers in an additive manufacturing method and to correct possible variances.

U.S. 2019/0163067 A1 discloses the use of OCT as a possible metrological method for characterization of the surface topography prior to printing, especially in the case of nonplanar substrates.

WO 2020/150 251 A1 discloses a specific implementation of OCT, polarization-sensitive OCT (PS-OCT), for the monitoring of the two-photon polymerization process. PS-OCT was selected for this purpose owing to its ability to give information as to the birefringence of the cured material, which is mentioned as a common problem in the 3D printing of polymers. For the determination of the curing volume and degree of curing under various curing conditions, by contrast, an analysis by high-speed camera and Raman spectroscopy was proposed. The proposed arrangement of the radiation sources for two-photon polymerization and PS-OCT envisages the joint utilization of optical elements. The beam divider envisaged is a dichroitic mirror, but this requires the use of radiation sources having distinctly different wavelengths. This restricts the selection of further jointly usable optical elements since these must accordingly be suitable for both wavelengths.

SUMMARY

It is an object of the disclosure to specify apparatuses and methods that enable improved in situ process monitoring of a nonlinear absorption polymerization method and a very accurate analysis of the starting materials, products, and substrates used in such a method.

This object is achieved by the subject matter of independent claims. The dependent claims relate to configurations of the solutions according to the disclosure.

A first aspect of the disclosure relates to a 3D printing apparatus for manufacture of a workpiece. The disclosure is not limited to a particular field of use, although it is typically possible to manufacture micro- and/or nanostructured workpieces.

The apparatus has a first radiation source designed to emit a first radiation for performance of a nonlinear absorption polymerization, for example a two-photon polymerization. In other words, the first radiation brings about a nonlinear absorption polymerization of a starting material, as described by way of introduction. The first radiation source may take the form of a laser light source, for example of an fs laser. The wavelength of the first radiation may, for example, partly or fully cover the spectral range between 760 and 800 nm and/or the spectral range between 1520 and 1600 nm. The wavelength of the first radiation may also lie in the wavelength range between 1000 and 1100 nm, for example in the case of use of an ultrafast Yb-doped fiber laser as first radiation source. It may also be possible to use a CW laser, for example with a wavelength of 405 nm. According to the target wavelength, i.e., the wavelength required for nonlinear absorption polymerization, and the desired pulse width, other spectral ranges are also possible.

As well as the first radiation source, the apparatus has a second radiation source designed to emit a second radiation for performance of optical coherence tomography. In other words, the second radiation can be used to perform optical coherence tomography, in order, for example, to monitor the nonlinear absorption polymerization, especially in situ.

According to the specific circumstances, for example depending on the wavelength required for the breakdown of the photoinitiator in the starting material in the nonlinear absorption polymerization, the wavelength of the second radiation may be chosen, for example, such that it is less than the wavelength of the first radiation. In this way, it is advantageously possible to increase the axial resolution capacity of the optical coherence tomography since the minimum separation of two points that are resolvable in axial z direction is proportional to the square of the wavelength, i.e., $\Delta z \propto \lambda^2$.

Alternatively, the wavelength of the second radiation may be chosen, for example, such that it is greater than the wavelength of the first radiation. The wavelength of the second radiation may typically be greater than 500 nm. It is advantageously possible thereby in many cases to avoid unwanted absorption of the second radiation in the starting material since typically utilized photoinitiators break down at a wavelength between 350 nm and 500 nm. The wavelength of the second radiation may, for example, be between 750 nm and 1400 nm, typically between 750 nm and 950 nm, further typically between 780 nm and 920 nm, or alternatively be between 900 nm and 1100 nm. Further typically, the second radiation source should not be a pulsed radiation source and, consequently, the second radiation should not be pulsed radiation, in order to avoid unintended triggering of nonlinear absorption polymerization. The second radiation source may be designed, for example, as a tunable laser or broadband radiation source, for example as a superluminescent diode. The high spectral bandwidth of these radiation sources enables high axial resolution in the performance of optical coherence tomography.

A first beam path is traversable by the first radiation, and a second beam path is traversable by the second radiation. In other words, the first radiation goes from the first radiation source along the first beam path to the position in the starting material where nonlinear absorption polymerization is to be brought about. The second radiation, by contrast, goes from the second radiation source along the second beam path to the site that is to be analyzed by optical coherence tomography.

It is optionally possible for the position in the starting material and the site that is to be analyzed by optical coherence tomography, i.e., the focal points of the first and second radiation, to correspond to one another or to vary slightly from one another in a controlled manner, in order, for example, to be able to perform an analysis by optical coherence tomography immediately before, during or immediately after the nonlinear absorption polymerization.

In addition, it is provided that the first beam path and the second beam path are formed entirely independently of one another, i.e., separately. Consequently, the first radiation may be guided along the first beam path until the first radiation, at a focal point of the first radiation, hits a site of polymerization of the starting material to be polymerized. The second radiation may be guided along the second beam path until the second radiation, at a focal point of the second radiation, hits an analysis site of a sample to be analyzed. No joint utilization of optical elements for the first and second beam paths is envisaged, i.e., the first and second beam paths run from the first or second radiation source to the focal point of the first or second radiation independently of one another and separately from one another.

This advantageously enables concurrent, i.e., simultaneous, performance of nonlinear absorption polymerization and optical coherence tomography. In addition, the separate formation of the two beam paths makes it possible to select the wavelength of the second radiation for performance of optical coherence tomography independently of the wavelength of the first radiation for performance of nonlinear absorption polymerization, and vice versa. In addition, the focal points of the first and second radiation may independently of one another be chosen identically or differently. Consequently, it is possible to conduct nonlinear absorption polymerization and optical coherence tomography simultaneously at the same focal point or at different focal points. Different focal points may be utilized, for example, in order to be able to undertake an OCT analysis of the ready-polymerized starting material. Because the polymerization process lasts for a certain period of time, it would be helpful for this purpose to have a focal point for the second radiation which is offset relative to the focal point for the first radiation by for example several lateral writing lines.

In addition, the mutually independent formation of the beam paths can enable a simpler practical implementation than in the case of an at least partly jointly utilized beam path, for example with regard to the build space available. By means of the 3D printing apparatus proposed, during a nonlinear absorption polymerization, it is possible to conduct an analysis by means of optical coherence tomography in situ and in real time.

In order to reduce unwanted back-reflections from the substrate surface or cuvette surface and hence to obtain a high signal-to-noise ratio in optical coherence tomography, preference is generally given to the use of immersed objective lenses for OCT imaging, i.e., in the second beam path.

The numerical aperture NA of the objective lens in the second beam path may be chosen differently depending on the specific use. If what is desired is, for example, an OCT analysis in a laterally and axially small volume region with high resolution, the objective lens may typically have a high numerical aperture NA. If, by contrast, what is desired is an OCT analysis in a region with a depthwise extent, the objective lens may typically have a small numerical aperture NA, for example a numerical aperture NA <0.5 or even NA <0.25. In the case of a small effective numerical aperture NA, there is a reduction in the lateral image resolution, but an increase in the image size in axial direction, which is important for three-dimensional imaging of high printed structures.

Optical elements are disposed both in the first and second beam paths, which may be image-forming and are disposed along an optical axis. Examples of optical elements include lenses and mirrors. Disposed at the end of each beam path opposite the respective radiation source is an objective lens that focuses the first or second radiation to a focal point. The focal point corresponds here to that position or to that location where the nonlinear absorption polymerization takes place or where the analysis is conducted by optical coherence tomography. The focal point can be moved by correspondingly moving mirrors disposed in the beam path, for example. The movement path of the focal point may also be referred to as the trajectory.

The objective lens in the first and second beam path may take the form of an immersed objective lens. It is optionally possible for the objective lens in the first beam path to be or have been arranged such that the objective lens dips into the starting material.

In addition, the 3D printing apparatus may have the following inter alia:
- a positioning and holding unit for positioning and holding the starting material and optionally the substrate,
- a control unit set up and designed to control the first and second radiation source and to control optical elements disposed in the beam paths, in order to be able to bring about a change in the focal point of the first radiation and the focal point of the second radiation,
- an analysis unit set up and designed to generate OCT images based on the second radiation,
- a storage unit set up and designed to store OCT images and/or to store CAD models of the workpiece to be manufactured, and/or
- an evaluation unit set up and designed to create 3D OCT scans from multiple OCT images.

In various exemplary embodiments, the first beam path and the second beam path may be formed such that the first radiation and the second radiation are incident on one another at an angle $\alpha$, where $0°<\alpha<180°$, for example $0°<\alpha\leq90°$.

The angle $\alpha$ denotes here the smaller of the two angles that is formed between the main beams of the first and the second radiation at an actual or theoretical point of intersection of the main beams of the first and the second radiation in the common plane of the main beams of the first and second radiation. The point of intersection and the plane here denote the respectively last linear section of the main beams of the first or second radiation before they hit the focal point. An actual point of intersection exists if the focal point of the main beam of the first radiation coincides with the focal point of the main beam of the second radiation, or the two focal points are arranged such that the main beams of the two radiations meet before the respective focal point is reached. If the focal points of the main beams of the two radiations, by contrast, are arranged such that the main beam of the first radiation and the main beam of the second radiation do not intersect, a theoretical point of intersection is formed by theoretical extension of the main beams of the first and second radiation. The term "main beam" relates to a beam that runs from the object or image point through the center of the pupil.

For example, the angle $\alpha$ may be or have been chosen such that the first radiation and/or the second radiation do not pass through the substrate. As a result, it is advantageously also possible to print substrates that are not transparent to the first and/or second radiation used.

The angle $\alpha$ may typically be or have been chosen so as to minimize the amount of already polymerized starting material outside the observation volume through which the second radiation must pass. Further typically, the angle $\alpha$ may be or have been chosen such that the second radiation does not run through already polymerized starting material.

For example, it may be the case that $\alpha=90°-\omega/2$, where $\omega$ is the object-side opening angle of the second beam path. In this way, it is possible to avoid difficulties and misinterpretations in the evaluation of the OCT signals that could otherwise be caused, for example, by superimposition of a portion of the second radiation that has passed through already polymerized starting material with a portion of the second radiation that has not passed through already polymerized starting material.

For example, the angle $\alpha$ may be 90°. The perpendicular alignment of the first and second radiation to one another can simplify the matching of the focal points of the first and second radiation to one another.

If the main beams of the first and the second radiation are not in a common plane, the main beams of the first and the second radiation may also be aligned skew to one another, meaning that the main beams may be in an offset arrangement to one another in the depthwise direction but do not intersect. In the 2D projection, the above observations may relate correspondingly to the angle $\alpha$, i.e., it may be the case, for example, that $\alpha=90°-\omega/2$.

The first beam path may typically be formed and arranged such that the first radiation hits the substrate surface parallel to the normal of the substrate surface, i.e., essentially at right angles. It is optionally possible for this purpose for the apparatus to have a positioning device for the substrate to be printed so as to enable positioning of the substrate surface with respect to the first radiation. This can contribute to higher accuracy of the structures to be printed.

The second beam path, with regard to the substrate surface to be printed, may be designed and arranged such that the second radiation hits the substrate surface at a non-90° angle to the normal of the substrate surface, i.e., not parallel to the substrate surface. It is optionally possible for this purpose for the apparatus to have a positioning device for the substrate to be printed so as to enable positioning of the substrate surface with respect to the second radiation. In this way, it is possible to avoid unwanted total internal reflection with the result of insufficiently evaluatable OCT signals since there is typically no exact correlation between the refractive index of the substrate and the refractive index of the immersion liquid or the starting material. An angle of less than 90° to the normal of the substrate surface may additionally be advantageous if structures incorporated into vertical side walls with overhanging elements are to be analyzed.

The starting material may be disposed in a vessel transparent to the radiation used, for example a transparent cuvette, in which the 3D printing operation is conducted.

Alternatively, it is also possible for one or both objective lenses of the first and second beam paths to be or have been dipped directly into the starting material. This has the advantage that it is possible to choose a vessel which is not transparent to the first and/or second radiation.

In further exemplary embodiments, the second beam path may be formed such that the second radiation hits a focal point through a substrate to be printed.

It is a requirement of this exemplary embodiment that the substrate is sufficiently transparent to the second radiation. The working distance of the objective lens in the second beam path, which may typically take the form of an immersed objective lens, should typically be chosen such that OCT images are possible through the substrate, which may have, for example, a substrate thickness of a few mm. A high working distance is also advantageous in this case because the working distance limits the maximum height of printed structures that can be imaged.

Since an optically smooth surface is required at the entry surfaces of the objective lens in the second beam path in order that no aberrations arise in the imaging, the exemplary embodiment in which the second radiation is guided through the substrate has the advantage that the substrate itself already constitutes this optically smooth surface and there is no need for a separate optically smooth surface, for example in the form of a cuvette having an optically smooth surface.

For example, the first radiation and the second radiation may hit their focal point from mutually opposite directions, for example essentially parallel to one another. In other words, the angle $\alpha$ at which the first radiation and the second radiation meet may be $\alpha=180°$. This has the advantage that the objective lenses of the first and second beam paths may be disposed far removed from one another, and therefore the likelihood of mechanical collision of the two objective lenses is reduced. Moreover, the selection of the objective lens is less limited because of the greater build space.

The first radiation and/or the second radiation may typically hit the substrate surface at right angles.

Alternatively or additionally, the first beam path may also be formed such that the first radiation hits a focal point through the substrate to be printed ("through-substrate configuration"). This configuration increases the selection of the starting material since not all starting materials can be utilized in the "dip-in" configuration in which the objective lens dips into the starting material without damaging the objective lens. Apart from the chemical compatibility between starting material and objective lens, in the case of a "dip-in" configuration, the refractive index of the starting material should be matched to the objective lens used, which is not satisfactorily achievable in all cases. By contrast, in the "through-substrate" configuration, it is potentially possible to specifically print a greater variety of starting materials with different refractive indices. This is because the first radiation, in this configuration, covers only a comparatively short distance in the starting material, which minimizes the aberrations even if the refractive index is not matched. However, in the case of the "through-substrate" configuration, the maximum height of the 3D print is limited since, firstly, aberrations occur as a result of the printed structures and, secondly, the working distance of the objective lens used limits the structure height in order to avoid a collision between substrate and objective lens.

A further aspect of the disclosure relates to a further 3D printing apparatus for manufacture of a workpiece.

The further apparatus has a first radiation source designed to emit a first radiation for performance of a nonlinear absorption polymerization. In other words, the first radiation brings about a nonlinear absorption polymerization of a starting material, as described by way of introduction. The first radiation source may take the form of a laser light source, for example of an fs laser. The wavelength of the first radiation may, for example, cover the spectral range between 760 and 800 nm or the spectral range between 1520 and 1600 nm. According to the target wavelength, i.e., the wavelength required for nonlinear absorption polymerization, and the desired pulse width, other spectral ranges are also possible.

As well as the first radiation source, the further apparatus has a second radiation source designed to emit a second radiation for performance of optical coherence tomography. In other words, the second radiation can be used to perform optical coherence tomography, in order, for example, to monitor the nonlinear absorption polymerization, especially in situ.

According to the specific circumstances, for example depending on the wavelength required for the breakdown of the photoinitiator in the starting material in the nonlinear absorption polymerization, the wavelength of the second radiation may be chosen, for example, such that it is less than the wavelength of the first radiation. In this way, it is advantageously possible to increase the axial resolution capacity of the optical coherence tomography since the minimum separation of two points that are resolvable in axial z direction is proportional to the square of the wavelength, i.e., $\Delta z \propto \lambda^2$.

Alternatively, the wavelength of the second radiation may be chosen, for example, such that it is greater than the wavelength of the first radiation. The wavelength of the second radiation may typically be greater than 500 nm. It is advantageously possible thereby in many cases to avoid unwanted absorption of the second radiation in the starting material since typically utilized photoinitiators break down at a wavelength between 350 nm and 500 nm. The wavelength of the second radiation may, for example, be between 750 nm and 1400 nm, typically between 750 nm and 920 nm, further typically between 780 nm and 920 nm, or alternatively be between 900 nm and 1100 nm. Further typically, the second radiation source should not be a pulsed radiation source and, consequently, the second radiation should not be pulsed radiation, in order to avoid unintended triggering of nonlinear absorption polymerization. The second radiation source may be designed, for example, as a tunable laser or broadband radiation source, for example as a superluminescent diode. The high spectral bandwidth of these radiation sources enables high axial resolution in the performance of optical coherence tomography.

The first radiation source and the second radiation source are arranged such that an optical system is at least partly utilizable collectively by the first radiation and the second radiation. The term "optical system" refers here to the totality of optical elements, for example lenses, mirrors etc., in their specific arrangement. If the optical system is utilized at least partly jointly by the first radiation and the second radiation, this means that it is possible for both the first radiation and the second radiation to pass through the optical elements of the optical system. It is possible here for the first beam path of the first radiation and the second beam path of the second radiation to be identical or to be formed differently from one another in that, for example, angles of incidence are or have been chosen differently.

In addition, the further apparatus has an objective lens which is disposed in the optical system and is designed for focusing of the first and second radiation to a focal point. In other words, both the first radiation and the second radiation are focused onto the starting material or the site to be analyzed with the same objective lens.

The optical system may be designed and arranged such that exclusively the first radiation or exclusively the second radiation is focusable onto a focal point by means of the objective lens. Alternatively, the optical system may be designed and arranged such that both the first radiation and the second radiation are focusable onto a focal point by means of the objective lens. The focal point may be here a common focal point, or different focal points may be or have been defined for the first and second radiation. In the case of different focal points, laterally different positions and/or positions that differ in depth may be or have been defined. This would be possible, for example, via an inclination of the optical axes of the beam paths of the first and second radiation, implemented, for example, by means of a tiltable mirror or scan mirror or by means of a beam divider in the beam path of the second radiation. In this way, it is possible, for example, as already mentioned, to conduct an OCT analysis of the ready-polymerized starting material.

It is correspondingly possible, at the focal point, for either nonlinear absorption polymerization and/or an analysis by optical coherence tomography to be effected at a particular juncture. The focal point can be moved by correspondingly moving mirrors disposed in the beam path, for example. The objective lens may be designed as an immersed objective lens or may be or have been arranged such that the objective lens dips into the starting material.

For coupling of the first radiation and/or the second radiation into the optical system, the further apparatus has an input coupling element. An input coupling element means an optically active component with the aid of which the first and/or second radiation, after being emitted by the first or second radiation source, enters the optical system for the first time, or which supplies the first and/or second radiation to the optical system. The input coupling element is consequently not a further optically active element within the optical system that interacts with the first or second radiation after it has already entered the optical system or been coupled into the optical system. The input coupling element is selected from a group consisting of a mechanically adjustable mirror, a galvanomirror, a polarizing beam divider, an intensity divider and a partly coated mirror. Consequently, the input coupling element does not take the form of a dichroitic mirror. It is also possible to combine two or more of the input coupling elements mentioned with one another.

As well as the function of coupling of the first and/or second radiation into the optical system, the input coupling element may additionally also act as an output coupling element for the second radiation. This means that the second radiation, after performance of the OCT analysis, i.e., after interaction with the sample to be examined and corresponding reflection in the sample volume, can be coupled back out of the optical system by means of the input coupling element, for example by reflection in the direction of an OCT analysis unit.

Both a mechanically adjustable mirror and a galvanomirror, by movement between two positions, make it possible for either the first radiation or the second radiation to be coupled alternately into the optical system in that a face that reflects either the first or second radiation is aligned accordingly. The alignment in the case of a mechanically adjustable mirror is effected exclusively by mechanical means, whereas the alignment in the case of a galvanomirror is effected by means of a galvanometer drive.

Both a mechanically adjustable mirror and a galvanomirror have the advantage that only one of the two radiations is coupled into the optical system in each case, and interactions of the two radiations with one another or disruptions of the OCT analysis by the first radiation can be avoided. In addition, the number and duration of the OCT analysis can be matched flexibly to the geometry of the component to be printed and/or the quality requirements. For instance, in the case of simple geometries, rather than it being absolutely necessary to analyze each printed layer by optical coherence tomography, it is possible to choose a greater time interval between two OCT analyses. This can have a positive effect on the time demands for production of the component. In addition, the computation demands can be reduced since less OCT analysis data are obtained. Accordingly, a lower computation power in an OCT analysis unit and/or a lower storage size in a storage unit may be adequate. Sequential performance of nonlinear absorption polymerization and OCT analysis may also be advantageous in applications in which the polymerization process takes some time, such that the focal point of the first radiation and hence also of the second radiation is already far removed from the time of complete polymerization owing to the high writing rate. In such a case, nonlinear absorption polymerization can be interrupted specially for an OCT analysis, or an OCT analysis can be conducted after conclusion of the writing process, such that the printed starting material can be analyzed by optical coherence tomography after complete polymerization thereof.

A polarizing beam divider, an intensity divider and a partly coated mirror enable simultaneous coupling of the first and second radiation into the optical system. Consequently, OCT analysis and nonlinear absorption polymerization can be performed simultaneously. This has the advantage that faults which occur in the course of polymerization, for example as a result of proximity effects, are recognized early and corresponding measures, for example stoppage of the faulty printing operation, can be initiated.

The mode of action of a polarizing beam divider is based on the use of differently linear-polarized radiation for the first and second radiation. While, for example, radiation with a first polarization state is transmitted, radiation with a second polarization state is reflected.

An intensity divider means a beam divider with a homogeneous optically active coating having a fixed transmission/reflection ratio of, for example, 80% transmission/20% reflection, based on the wavelength of the first or second radiation. Consequently, for example, 80% of the first radiation may be transmitted, while 20% of the first radiation is reflected. Correspondingly, 20% of the second radiation may be transmitted, while 80% of the second radiation is reflected.

By contrast, a partly coated mirror has no homogeneous optically active coating, but rather an optically active coating that differs in different regions. For example, a central region of the partly coated mirror may have a coating having a reflectance of 100%, based on the wavelength of the first and second radiation, while the reflectance in the edge region is virtually 0%, meaning that the coating is nearly 100% transmissive. A beam division can be achieved in that, for example, the second radiation has a beam of rays with a smaller diameter than the beam of rays of the first radiation, such that the second radiation hits the partly coated mirror only in the central region, where it is reflected to an extent of nearly 100%. The first radiation, by contrast, also hits the partly coated mirror in the edge regions and can be correspondingly transmitted. In other words, the coating can block the first radiation by central shadowing with a small effect on the spot shape and completely mirror the second radiation inward.

The use of a polarizing beam divider, an intensity divider or a partly coated mirror has the advantage that the input coupling element is rigid and therefore no mechanical wear will be expected. In addition, the OCT analysis and the nonlinear absorption polymerization can be performed simultaneously.

By contrast with a dichroitic mirror as input coupling element, all the variants of the input coupling element mentioned have the advantage that wavelengths close to one another can be utilized for the first radiation and the second radiation. This in turn facilitates the selection of the other optical elements of the optical system that have to be suitable for both wavelengths.

By means of the 3D printing apparatus proposed, during a nonlinear absorption polymerization, it is advantageously possible to conduct an analysis by means of optical coherence tomography in situ and in real time.

Further optical elements may be disposed in the optical system, which may be image-forming and are disposed along an optical axis. Examples of optical elements include lenses and mirrors.

In addition, the 3D printing apparatus may have the following inter alia:
  a positioning and holding unit for positioning and holding the starting material and optionally the substrate,
  a control unit set up and designed to control the first and second radiation source, to control optical elements disposed in the optical system in order to be able to bring about a change in the focal point of the first radiation and the focal point of the second radiation, and to control an input coupling element in the form of a mechanically adjustable mirror or galvanomirror in order to switch between the first and second radiation,
  an analysis unit set up and designed to generate OCT images based on the second radiation,
  a storage unit set up and designed to store OCT images and/or to store CAD models of the workpiece to be manufactured, and/or
  an evaluation unit set up and designed to create 3D OCT scans from multiple OCT images.

In various exemplary embodiments, the apparatus may have an analysis unit set up and designed to generate optical coherence tomography images based on the second radiation. The analysis unit here has multiple measurement channels such that multiple analysis sites can be analyzed simultaneously by optical coherence tomography.

Each measurement channel here has in each case a radiation source or a radiation source position and a focal point. What is meant by "radiation source position" is that the radiation from a physical radiation source is spatially divided such that each measurement channel is provided with radiation at a particular position. For example, the apparatus may have a device, for example a photonic chip, which is designed to divide the second radiation from the second radiation source between multiple measurement channels, for example six measurement channels. By means of the various measurement channels, the second radiation may be or have been provided at different lateral and/or axial positions and may be or have been steered to different analysis sites. Each measurement channel may consequently create a different focal point in each case. The respective measurement channel serves as detection channel for the returning radiation after interaction with the sample to be analyzed.

The provision of multiple measurement channels has the advantage that multiple analysis sites, for example sample regions, can be analyzed simultaneously, for example an analysis site with as yet unpolymerized starting material, an analysis site with partly polymerized starting material and an analysis site with fully polymerized starting material. In this way, it is possible to obtain information as to the sequence of processes in time. In addition, the analysis duration can be shortened. It is also possible for the multiple measurement channels in OCT analyses with high numerical aperture and hence restricted A scan depth to enable the simultaneous imaging of different depth regions.

In further exemplary embodiments, the second radiation source may emit a wave that is constant over time, i.e., not pulsed, as the second radiation.

In this way, it is advantageously possible to avoid unwanted polymerization of the starting material during the analysis by optical coherence tomography. The second radiation source used may, for example, be sufficiently weak continuous wave light sources that excite the photoinitiators in the starting material not by one-photon absorption, for example a combination of multiple superluminescent light-emitting diodes that also advantageously achieve a wide spectral bandwidth and hence an axial resolution of just a few μm.

In further exemplary embodiments, the apparatus may have a vessel for arrangement of a starting material to be polymerized, wherein the vessel is designed to be at least partly transparent to the first radiation and/or second radiation.

What is meant by "transparent" is that the first radiation and/or second radiation can be transmitted at least partly through a wall of the vessel and, in this way, can reach the interior which is enclosed by the vessel and in which the starting material to be polymerized can be disposed. For example, it may be provided that more than 70% or more than 80% or more than 90% or more than 95% of the first radiation and/or second radiation is transmitted through the wall of the vessel. The vessel may take the form of a cuvette, for example.

The at least partly transparent vessel makes it possible to polymerize and/or to analyze a starting material disposed in the vessel through the wall of the vessel in a simple and convenient manner. This can contribute to simplification of the constructive structure of the apparatus since the first or second radiation need not necessarily pass through an opening in the vessel to the starting material.

The vessel may optionally be sealed tight or designed to be sealable tight. This offers the option of polymerizing and/or analyzing starting materials sensitive to environmental influences, for example oxygen, moisture, etc.

In further exemplary embodiments, an objective lens of the apparatus may be formed and arranged such that it can be immersed into a starting material to be polymerized.

This has the advantage that it is possible to choose, for the arrangement of the starting material, a vessel which is not transparent to the first and/or second radiation.

A further aspect of the disclosure relates to a 3D printing method for manufacture of a workpiece by means of one of the apparatuses elucidated above. The method provides that nonlinear absorption polymerization and optical coherence tomography are performed in alternation with one another or simultaneously, i.e., at the same time.

The above observations for elucidation of the 3D printing apparatuses also serve for description of the method according to the disclosure. The advantages of such a 3D printing apparatus are correspondingly associated with the method according to the disclosure.

Further aspects of the disclosure relate to different methods in which optical coherence tomography is utilized in conjunction with nonlinear absorption polymerization. The methods can be executed by means of the above-described 3D printing apparatuses. However, it is pointed out that the methods elucidated below can also be performed independently of the above-described 3D printing apparatuses, for example with 3D printing apparatuses that combine nonlinear absorption polymerization and optical coherence tomography with one another in some other way, or apparatuses that implement nonlinear absorption polymerization and optical coherence tomography independently of one another.

A first method relates to the analysis of a quality of a starting material for nonlinear absorption polymerization by optical coherence tomography, wherein a quality parameter of the starting material is ascertained by optical coherence tomography. The method can be executed by means of one of the above-elucidated 3D printing apparatuses. Optical coherence tomography can typically be effected three-dimensionally.

It is optionally possible to fix parameters of nonlinear absorption polymerization with reference to the quality parameter ascertained. Illustrative parameters for this purpose include the (laser) power of the radiation used for nonlinear absorption polymerization, i.e., for example, the first radiation source or first radiation, the trajectory, i.e., the movement path along which the focal point of the radiation used for nonlinear absorption polymerization is moved across the starting material, and the writing time, for example the speed profile with which the trajectory is performed. The parameters fixed in such a way can then be used for nonlinear absorption polymerization.

For example, at positions where contamination in the starting material has been found, it is possible to use parameters other than standard parameters for nonlinear absorption polymerization, for example a higher laser power, a longer writing time etc. The trajectory can be modified in order to be able to write at all or in an improved manner at positions of contamination in the starting material.

As a result, it is possible to improve the quality of the workpiece to be manufactured by nonlinear absorption polymerization in the case of contaminated starting material.

Alternatively or additionally, it is also possible to fix optical coherence tomography parameters with reference to the quality parameter ascertained. Illustrative parameters for this purpose are the positions of the focal points of the radiation utilized for optical coherence tomography, and the fixing of an appropriate trajectory for the focal point of the radiation utilized for optical coherence tomography. The parameters fixed in such a way can then be used for optical coherence tomography.

For example, the focal points of the radiation utilized for optical coherence tomography and hence the analysis sites can be fixed such that a more detailed analysis can be effected at positions where contamination in the starting material has been found by comparison with uncontaminated positions.

This may enable improved analysis of the workpiece to be manufactured, such that faulty workpieces are recognized early, for example as early as during their manufacture, and countermeasures can be taken if necessary.

A further method relates to the verification of the position and/or alignment of a substrate to be printed by nonlinear absorption polymerization, wherein characteristic features of the substrate to be printed are identified by optical coherence tomography. The method can be executed by means of one of the above-elucidated 3D printing apparatuses. Optical coherence tomography can typically be effected three-dimensionally.

Characteristic features of the substrate to be printed mean objects, for example labels, boundaries or contaminants, on the surface or within the substrate that are localizable unambiguously, meaning that the position thereof with regard to the substrate is known, and on the basis of which the position and/or alignment of the substrate can be determined. The term "position" describes here the absolute positioning of the substrate with regard to a reference point, for example in a coordinate system. The term "alignment" describes the rotational position of the substrate with regard to a reference point, for example in a coordinate system; in other words, the alignment determines, for example, which edge of a cubic substrate is where.

Identification of such characteristic features by optical coherence tomography can be utilized in order to assist the print alignment process and to enable very exact positioning and/or alignment of the region to be printed with regard to the focal point of the radiation utilized for nonlinear absorption polymerization. In this way, it is possible to improve the quality of the workpieces to be manufactured, for example in that it is possible to reduce variances between the manufactured workpiece and the corresponding original.

A further method relates to the ascertainment of a spatially resolved degree of conversion of a nonlinear absorption polymerization by optical coherence tomography. The method can be executed by means of one of the above-elucidated 3D printing apparatuses. Optical coherence tomography can typically be effected three-dimensionally. This advantageously enables a three-dimensionally resolved determination of the local degree of conversion.

It is optionally possible to fix parameters of nonlinear absorption polymerization with reference to the degree of conversion ascertained. Illustrative parameters for this purpose here too include the (laser) power of the radiation used for nonlinear absorption polymerization, the trajectory and the writing time.

For example, in the case of an inadequate degree of conversion, it is possible to use parameters other than standard parameters for nonlinear absorption polymerization, for example a higher laser power, a longer writing time etc. The trajectory can be modified in order, for example, to bring about renewed or extended irradiation at positions with too low a degree of conversion. It is also possible to fix the trajectory by (initially) missing out positions where polymerization has not yet taken place in full, i.e., where the degree of conversion is too low, in the writing of the subsequent layer during the layer-by-layer construction of the workpiece to be manufactured, for example in order to avoid unwanted polymerization processes. The parameters fixed in such a way can then be used for nonlinear absorption polymerization.

Alternatively or additionally, it is also possible to fix optical coherence tomography parameters with reference to the degree of conversion ascertained. Illustrative parameters for this purpose are the positions of the focal points of the radiation utilized for optical coherence tomography, and the fixing of an appropriate trajectory for the focal point of the radiation utilized for optical coherence tomography. The parameters fixed in such a way can then be used for optical coherence tomography.

For example, the focal points of the radiation utilized for optical coherence tomography and hence the analysis sites can be fixed such that a more detailed analysis can be effected at positions where too low a degree of conversion has been found by comparison with positions having a sufficient degree of conversion.

This may enable improved analysis of the workpiece to be manufactured, such that faulty workpieces are recognized early, for example as early as during their manufacture, and countermeasures can be taken if necessary.

It is thus possible to influence the degree of conversion and, together therewith, the properties of the manufactured workpiece that are dependent on the degree of conversion in a locally resolved manner.

A further method relates to the analysis of the structure sharpness of a structure created by nonlinear absorption polymerization. For this purpose, the structure sharpness is ascertained using a refractive index profile determined in a spatially resolved manner by optical coherence tomography, optionally in situ. The method can be executed by means of one of the above-elucidated 3D printing apparatuses. Optical coherence tomography can typically be effected three-dimensionally.

It is optionally possible to fix parameters of nonlinear absorption polymerization with reference to the structure sharpness ascertained. Illustrative parameters for this purpose here too include the (laser) power of the radiation used for nonlinear absorption polymerization, the trajectory and the writing time. For example, in the case of inadequate structure sharpness, it is possible to use parameters other than standard parameters for nonlinear absorption polymerization, for example a higher laser power, a longer writing time etc. The trajectory can be modified in order, for example, to bring about renewed or extended irradiation at positions with too low a structure sharpness. The parameters fixed in such a way can then be used for nonlinear absorption polymerization.

Alternatively or additionally, it is also possible to fix optical coherence tomography parameters with reference to the structure sharpness ascertained. Illustrative parameters for this purpose are the positions of the focal points of the radiation utilized for optical coherence tomography, and the fixing of an appropriate trajectory for the focal point of the radiation utilized for optical coherence tomography. The parameters fixed in such a way can then be used for optical coherence tomography.

For example, the focal points of the radiation utilized for optical coherence tomography and hence the analysis sites can be fixed such that a more detailed analysis can be effected at positions where too low a structure sharpness has been found by comparison with positions having sufficient structure sharpness.

This may enable improved analysis of the workpiece to be manufactured, such that faulty workpieces are recognized early, for example as early as during their manufacture, and countermeasures can be taken if necessary.

It is thus possible to influence the structure sharpness and, together therewith, the properties of the manufactured workpiece that are dependent on the structure sharpness in a locally resolved manner.

For example, it is possible to ascertain the degree of conversion and/or the structure sharpness in situ during nonlinear absorption polymerization. Parameters of nonlinear absorption polymerization, for example laser power and writing time, can then be controlled depending on the degree of conversion ascertained and/or the structure sharpness ascertained, for example taking account of geometric deformations and/or a degree of conversion different than a target function. Insufficiently polymerized regions may be irradiated again, for example by changing the trajectory of the focal point of the radiation utilized for nonlinear absorption polymerization, in order, for example, to further increase the degree of conversion or to alter the refractive index and/or the modulus of elasticity. It is possible to form a closed-loop control circuit based on the OCT data.

Alternatively or additionally, it is also possible to control optical coherence tomography parameters depending on the degree of conversion ascertained and/or the structure sharpness ascertained, for example according to the principles elucidated above.

A further method relates to the three-dimensional reconstruction of a workpiece manufactured by nonlinear absorption polymerization, wherein, during the manufacture of the workpiece, sequences in which printing is effected by nonlinear absorption polymerization alternate with sequences in which an analysis is effected by optical coherence tomography. The method can be executed by means of one of the above-elucidated 3D printing apparatuses. Optical coherence tomography can typically be effected three-dimensionally.

It is optionally possible to fix a number and/or a juncture of the sequences in which an analysis is effected by optical coherence tomography depending on an expected morphology of the workpiece manufactured, of a starting material of the workpiece manufactured and/or parameters of the nonlinear absorption polymerization. The nonlinear absorption polymerization parameters may be selected here from a group comprising: laser power of the radiation used for the nonlinear absorption polymerization, trajectory and writing time. In this way, it is firstly possible to exactly reconstruct the printed workpiece and secondly to keep the time demands to a minimum.

BRIEF DESCRIPTION OF THE DRAWINGS

The disclosure will now be described with reference to the drawings wherein.

DESCRIPTION OF EXEMPLARY EMBODIMENTS

Figure 1:
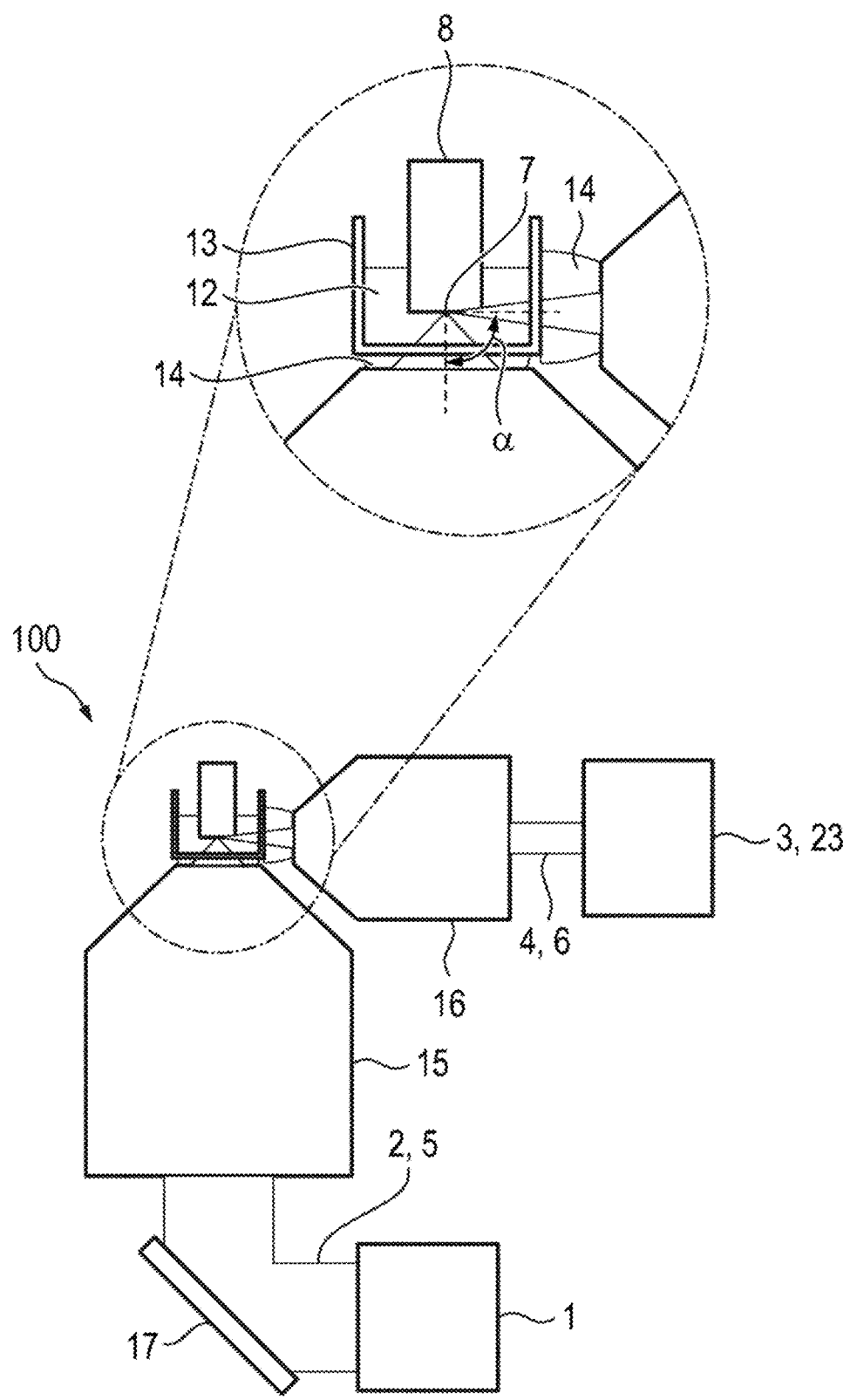
FIG. 1 shows a schematic diagram of a 3D printing apparatus in a first exemplary embodiment.

In the examples elucidated hereinafter, reference is made to the appended drawings that form part of the examples and in which specific embodiments in which the disclosure can be implemented are shown by way of illustration. It is understood that other embodiments can be used and structural or logical modifications can be undertaken, without departing from the scope of protection of the present disclosure. It will be apparent that the features of the various illustrative embodiments described herein can be combined with one another, unless specifically stated otherwise. Therefore, the detailed description that follows should not be considered to be limiting, and the scope of protection of the present disclosure is defined by the appended claims. Where appropriate, identical or similar elements have been given identical reference numerals in the drawings.

The expression "and/or" used here, when it is used in a series of two or more elements, means that any of the elements listed can be used alone, or any combination of two or more of the elements listed can be used. If for example a composition containing the components A, B and/or C is described, the composition may contain A alone; B alone; C alone; A and B in combination; A and C in combination; B and C in combination; or A, B, and C in combination.

It is pointed out explicitly that, for the sake of simplicity and for easier understanding of the components specified and claimed, these are usually named as single components. According to the individual circumstances, it is also possible to use multiple corresponding components in series or parallel for the same function. Such multipart arrangements should also be explicitly encompassed by the claims and the description.

FIG. 1 is a schematic diagram of a first exemplary embodiment of a 3D printing apparatus 100 for manufacture of a workpiece. The circled region is shown in enlarged form.

The apparatus 100 has a first radiation source 1 that emits a first radiation 2. By means of the first radiation 2, it is possible to conduct a nonlinear absorption polymerization, for example a two-photon polymerization. For this purpose, the first radiation 1 is guided along a first beam path 5 until, at the focal point 7, it hits the liquid starting material 12 to be polymerized, which is disposed in a vessel 13 in the form of a transparent cuvette. The first radiation source 1 is designed as an fs laser radiation source in the exemplary embodiment, meaning that the first radiation 2 is fs laser radiation.

Several optical elements are present for forming of the first beam path 5, of which FIG. 1 shows solely the mirror 17 for reasons of clarity. In addition, a first objective lens 15 is disposed in the first beam path 5, with which the focal point 7 of the first radiation 2 can be fixed. The first objective lens 15 is designed as an immersed objective lens, i.e., an immersion liquid 14 is disposed between the front lens of the first objective lens 15 and the vessel 13 containing the starting material 12. In this way, it is possible to improve the resolution capacity, and it is possible to print smaller structures with higher accuracy. The first objective lens 15 in the exemplary embodiment has a numerical aperture NA=1.4 and a scale of 40×.

In addition, the apparatus 100 has a second radiation source 3 that emits a second radiation 4. By means of the second radiation 4, it is possible to conduct an analysis by optical coherence tomography. For this purpose, the second radiation 4 is guided along a second beam path 6 until, at the focal point 7, it hits the sample to be analyzed, for example the liquid starting material 12 to be polymerized. The second radiation source 3 in the exemplary embodiment takes the form of a tunable laser or of a superluminescent diode. The second beam path 6 is formed independently of the first beam path 5.

Several optical elements are present for forming of the second beam path 6, which are not shown in detail in FIG. 1 for reasons of clarity. In addition, a second objective lens 16 is disposed in the second beam path 6, with which the focal point 7 of the second radiation 4 can be fixed. The focal point 7 of the first radiation 2 may correspond to the focal point 7 of the second radiation 4, as shown in FIG. 1. Alternatively, the two focal points 7 may differ from one another. For example, the focal point 7 of the second radiation 4 may lie immediately in front of or immediately behind the focal point 7 of the first radiation 2, based on a movement of the focal point 7 of the first radiation 2. This enables an analysis by OCT immediately before or after the nonlinear absorption polymerization.

The second objective lens 16 is likewise designed as an immersed objective lens, i.e., an immersion liquid 14 is disposed between the front lens of the second objective lens 16 and the vessel 13 containing the starting material 12. In this way, it is possible to achieve an improved signal-to-noise ratio in optical coherence tomography by preventing unwanted back-reflections at the surface of the substrate 8 or of the vessel 13. With regard to the numerical aperture NA of the second objective lens 16, NA <0.25.

It is optionally possible for the first beam path 5 and/or the second beam path 6 to be designed to be fiber-guided.

In the first exemplary embodiment, the first beam path 5 and the second beam path 6 are designed such that the first radiation 2 and the second radiation 4 hit the focal point 7 essentially perpendicularly to one another, meaning that for the angle $\alpha$, it holds true that $\alpha=90°$. Neither the first radiation 2 nor the second radiation 4 passes through the substrate 8 on its way to the focal point 7, and so it is also possible to use nontransparent substrates 8 for the first radiation 2 and the second radiation 4. As apparent in FIG. 1, the diameter of the first beam path 5 is distinctly greater than the diameter of the second beam path 6.

The apparatus 100 additionally has an analysis unit 23 which is accommodated in a shared housing with the second radiation source 3, and with which an OCT analysis at the focal point 7 can be undertaken using the second radiation 4. In other words, the analysis unit 23 generates OCT images based on the second radiation 4. It is optionally possible for the analysis unit 23 to have several measurement channels, such that several analysis sites can be analyzed simultaneously.

In addition, the apparatus 100 may have further units (not shown), for example a control unit, a storage unit, an evaluation unit, a positioning and holding unit.

In a second exemplary embodiment (not shown), for the angle $\alpha$, it holds true that $\alpha=80°$. This angle $\alpha$, for an object-side opening angle of the second objective lens 16 of $\omega=20°$, can be found as follows: $\alpha=90°-\omega/2$.

Figure 2:
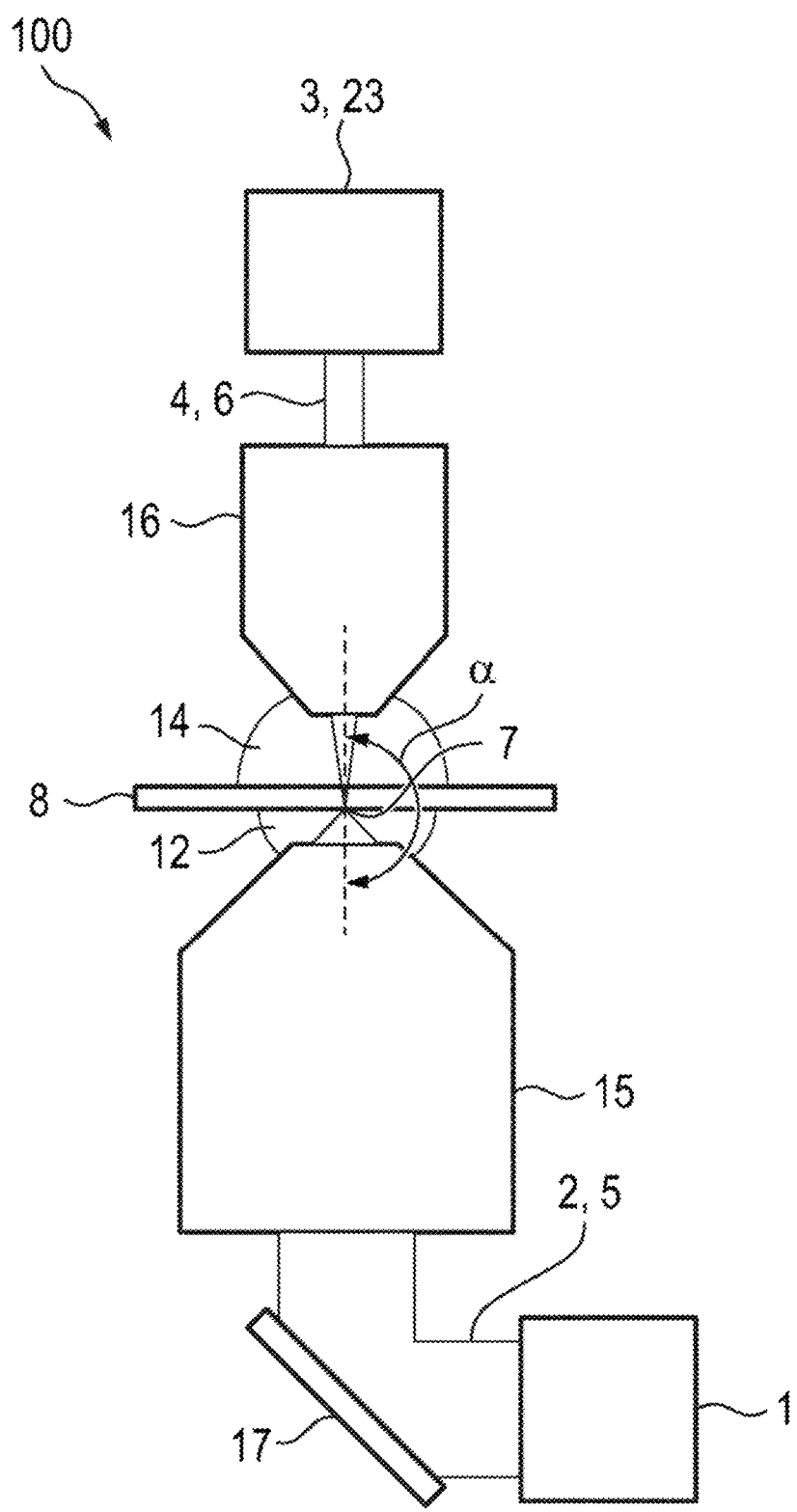
FIG. 2 shows a schematic diagram of a 3D printing apparatus in a third exemplary embodiment.

FIG. 2 shows, in schematic form, a third exemplary embodiment of a 3D printing apparatus 100 for manufacture of a workpiece. By contrast with the first and second exemplary embodiments, the second radiation 4 hits the focal point 7 through the substrate 8. This requires a substrate 8 having a material which is transparent to the second radiation 4. The angle α between the first radiation 2 and the second radiation 4 is α=180°.

A further difference from the first exemplary embodiment is that the starting material 12 is not disposed in a vessel 13; instead, the first objective lens 15 dips directly into the starting material 12. The first objective lens 15 is therefore also not in the form of an immersed objective lens. For the rest, reference is made to the elucidations relating to FIG. 1.

Figure 3:
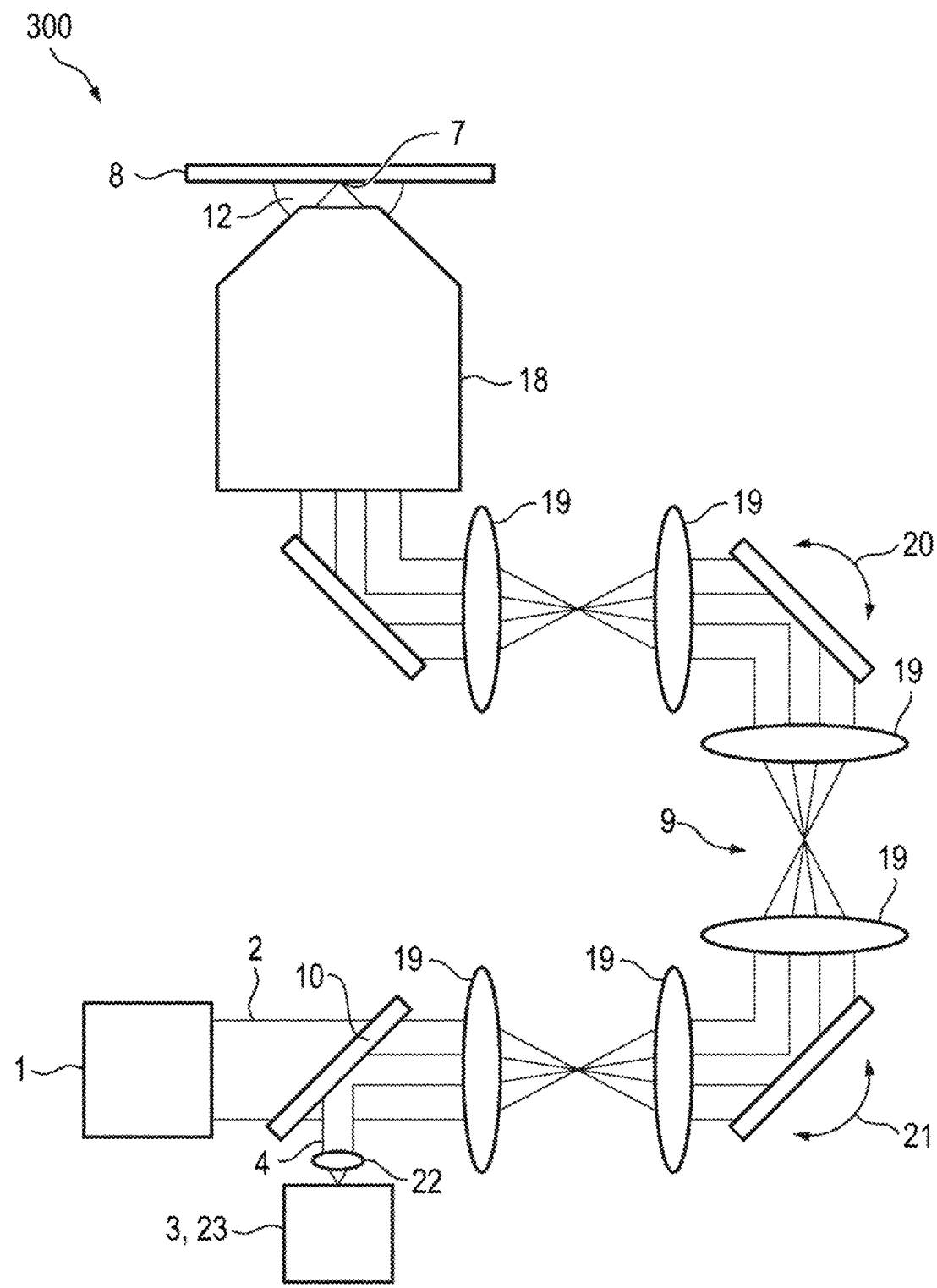
FIG. 3 shows a schematic diagram of a 3D printing apparatus in a fourth exemplary embodiment.

FIG. 3 shows a fourth exemplary embodiment of a 3D printing apparatus 300 for manufacture of a workpiece.

The apparatus 300 has a first radiation source 1 that emits a first radiation 2. By means of the first radiation 2, it is possible to conduct a nonlinear absorption polymerization. For this purpose, the first radiation 1 is guided along the optical system 9 until, at the focal point 7, it hits the liquid starting material 12 to be polymerized. The first radiation source 1 is designed as an fs laser radiation source in the exemplary embodiment, meaning that the first radiation 2 is fs laser radiation. It is optionally possible for the first radiation 2 to be fiber-guided.

The optical system 9 comprises several optical elements, of which FIG. 3 shows several lenses 19. In addition, the optical system 9 comprises an objective lens 18 with which the focal point 7 of the first radiation 2 can be fixed. By means of the galvanomirror 20 for the x direction and the galvanomirror 21 for the y direction, the surface of the sample can be scanned, for example according to a definable CAD model of the workpiece to be manufactured. The objective lens 18 dips directly into the starting material 12. The objective lens 18 in the exemplary embodiment has a numerical aperture NA=1.4 and a scale of 40×.

In addition, the apparatus 300 has a second radiation source 3 that emits a second radiation 4. By means of the second radiation 4, it is possible to conduct an analysis by optical coherence tomography. For this purpose, the second radiation 4 is likewise guided in the optical system 9 until, at the focal point 7, it hits the sample to be analyzed, for example the liquid starting material 12 to be polymerized. The second radiation source 3 is designed in the exemplary embodiment as a tunable laser or as a superluminescent diode, meaning that the second radiation 4 is laser radiation. The second radiation 4 can be transported by means of an optical single-mode fiber and be coupled into the optical system 9 via the fiber coupler 22.

The apparatus 300 has an input coupling element 10 which takes the form of a polarizing beam divider in the exemplary embodiment, but may alternatively also take the form of a mechanically adjustable mirror, galvanomirror, intensity divider or partly coated mirror. By means of the input coupling element 10 in the form of a polarizing beam divider, it is possible to simultaneously couple the first radiation 2 and the second radiation 4 into the optical system 9 in order to be able to simultaneously conduct a nonlinear absorption polymerization and an analysis by optical coherence tomography.

By means of the fiber coupler 22, it is possible to fix the diameter of the beam of rays of the second radiation 4 such that, when it hits the input coupling element 10, it is smaller than the diameter of the beam of rays of the first radiation 2. By virtue of the controlled adjustment of the diameter of the beam of rays of the second radiation 4, it is possible to deliberately underexpose the aperture of the objective lens 18, i.e., it is possible to deliberately reduce the effective numerical aperture NA of the objective lens 18 for the second radiation 4.

The apparatus 300 additionally has an analysis unit 23 which is accommodated in a shared housing with the second radiation source 3, and with which an OCT analysis at the focal point 7 can be undertaken using the second radiation 4. In other words, the analysis unit 23 generates OCT images based on the second radiation 4. It is optionally possible for the analysis unit 23 to have several measurement channels, such that several analysis sites can be analyzed simultaneously. For this purpose, the second radiation 4 can be divided between the individual measurement channels by means of a photonic chip.

In addition, the apparatus 300 may have further units (not shown), for example a control unit, a storage unit, an evaluation unit, a positioning and holding unit.

Figure 4A:
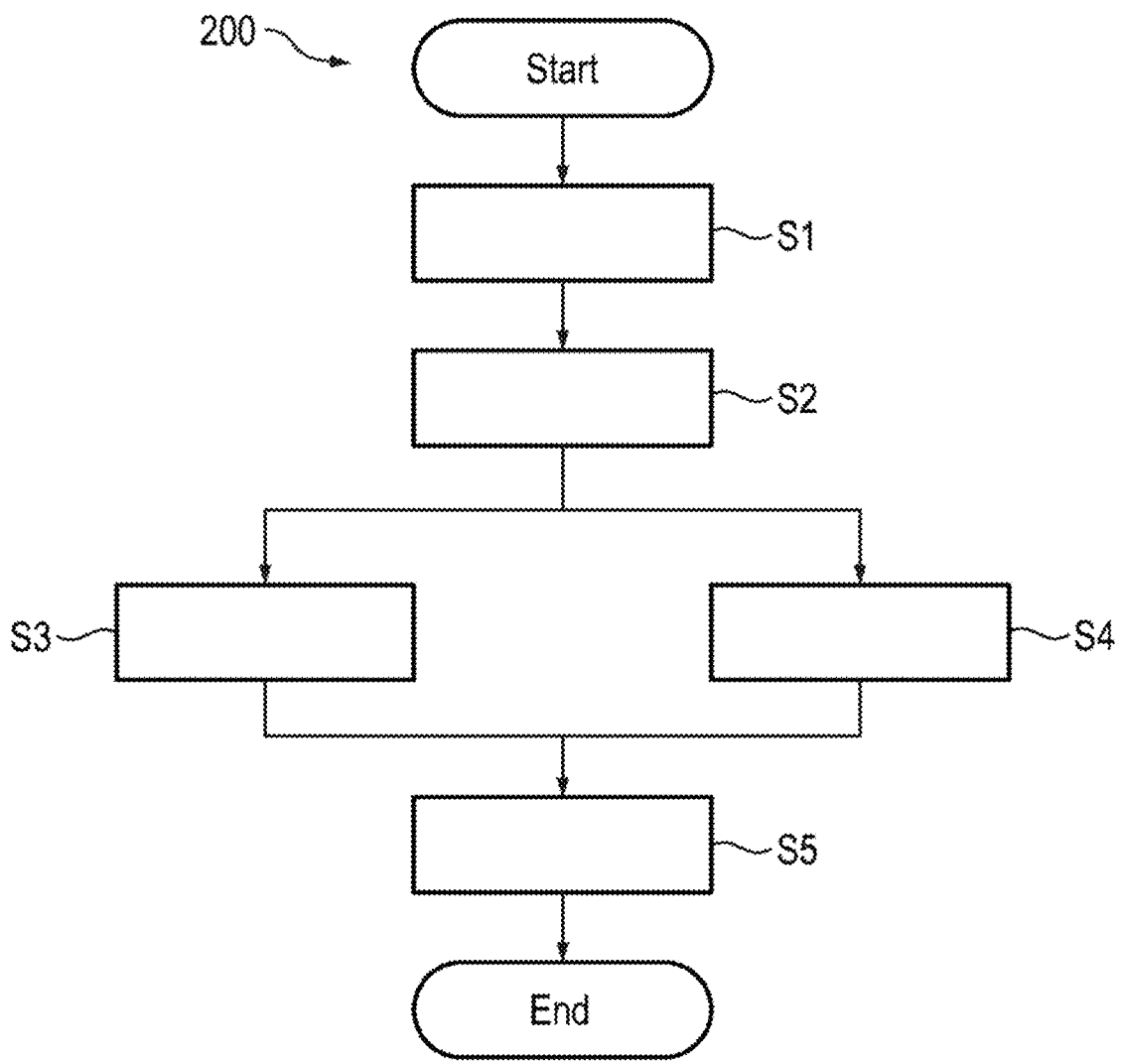
FIGS. 4A and B show illustrative flow diagrams for 3D printing methods for manufacture of a workpiece.
Figure 4B:
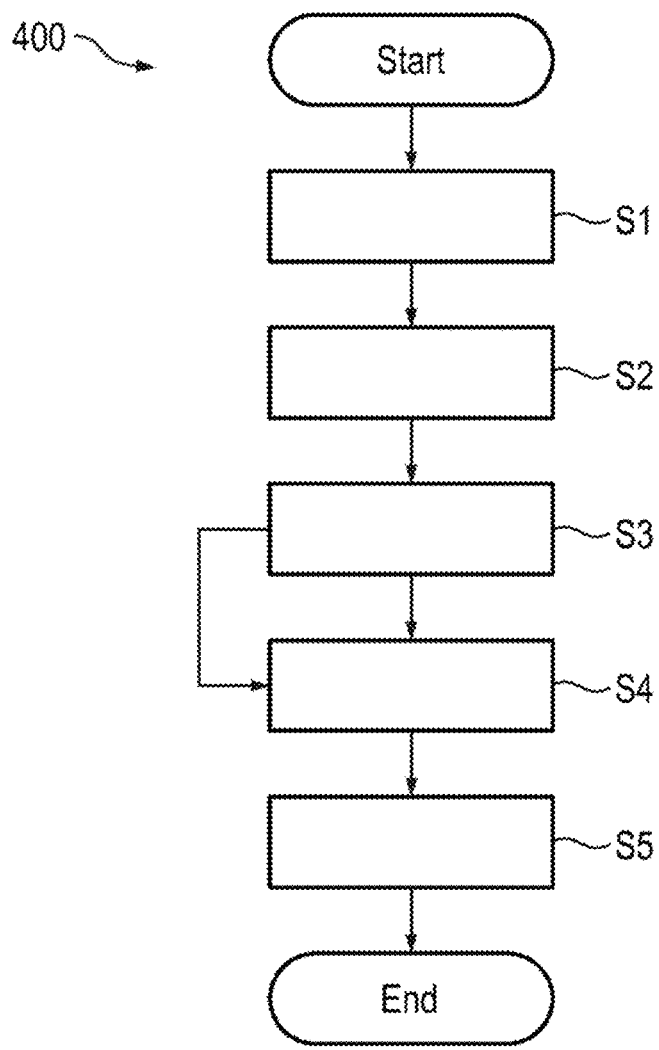

With reference to FIGS. 4a and 4b, illustrative 3D printing methods 200, 400 for manufacture of a workpiece are elucidated in detail hereinafter. FIG. 4A shows a flow diagram of a 3D printing method 200 in which nonlinear absorption polymerization S3 and optical coherence tomography S4 are performed simultaneously. The method 200 may be performed, for example, by means of one of the 3D printing apparatuses elucidated above with reference to FIG. 1 or FIG. 2.

After the start of the method 200, in method step S1, a substrate is provided, to which material is to be applied by nonlinear absorption polymerization and which, together with the material applied, forms the manufactured workpiece after the method 200 has ended.

In method step S2, the substrate is positioned in the starting material. The starting material used may, for example, be the IP Dip® product from the manufacturer Nanoscribe GmbH. Alternatives to this starting material include the following products: IP-S, IP-Q, IP-Visio, IP-n162, IP-L from the manufacturer Nanoscribe GmbH, OrmoComb® from the manufacturer Micro resist technology Gesellschaft für chemische Materialien spezieller Photoresistsysteme mbH, upphoto, updraft, upbrix, upsol, upopto from the manufacturer UpNano GmbH.

The starting material typically has a liquid consistency and may be present in a vessel, for example a cuvette, a dish etc. The vessel is designed here to be transparent to the radiation which is utilized for performance of the nonlinear absorption polymerization and for performance of optical coherence tomography. For positioning of the substrate, it is dipped at least partly into the starting material, such that starting material is present at least at the interface between substrate and polymer to be formed.

In method step S3, a nonlinear absorption polymerization of the starting material is conducted. For more detailed elucidation of this method step S3, reference is made to the above description of nonlinear absorption polymerization.

At least partly overlapping in time, i.e., simultaneously, with method step S3, optical coherence tomography is performed in method step S4. By means of optical coherence tomography, it is possible to conduct an in situ analysis during 3D printing. For example, it is possible to determine the degree of conversion of the nonlinear absorption polymerization in a spatially resolved manner, for example as described hereinafter with reference to FIG. 6A and FIG. 6B. Alternatively or additionally, the structure sharpness of the structures created by nonlinear absorption polymerization can be analyzed, for example as described hereinafter with reference to FIG. 7A and FIG. 7B. Alternatively or additionally, the manufactured workpiece can be three-dimensionally reconstructed, for example as described hereinafter with reference to FIG. 8.

Before commencement of the nonlinear absorption polymerization, optical coherence tomography can be utilized in order to align the substrate to be printed by identifying characteristic points on the substrate to be printed. Alternatively or additionally, the quality of the starting material can be analyzed by optical coherence tomography, as described, for example, hereinafter with reference to FIG. 5.

Once all the desired structures have been produced by nonlinear absorption polymerization, excess starting material is washed off with a suitable solvent in method step S5, so as to obtain the manufactured workpiece. This ends the method 200.

FIG. 4B shows a flow diagram of a further illustrative 3D printing method 400 for manufacture of a workpiece in which nonlinear absorption polymerization S3 and optical coherence tomography S4 are performed in alternation with one another. The method 400 may be conducted, for example, by means of the 3D printing apparatus elucidated above with reference to FIG. 3, wherein the input coupling element 10 takes the form of a mechanically adjustable mirror or of a galvanomirror.

After commencement of the method 400, method steps S1 and S2 are performed as in the method 200 elucidated above with reference to FIG. 4A. By contrast with the method 200, however, the subsequent method steps S3 and S4, rather than being conducted in parallel over time, are conducted in alternation to one another. First of all, for example, in step S3, a nonlinear absorption polymerization may be conducted in order to create a portion of the desired structures from the starting material. At a suitable juncture, the nonlinear absorption polymerization is stopped and the method continues to method step S4 in which an analysis is conducted by optical coherence tomography. In this regard, reference is made to the above elucidations relating to method step S4 with reference to FIG. 4A.

Once the analysis by optical coherence tomography has ended, the method goes back to method step S3, and the nonlinear absorption polymerization is continued. Method steps S3 and S4 alternate until all the desired structures have been produced. Subsequently, excess starting material is washed off in method step S5, so as to obtain the manufactured workpiece. This ends the method 400.

As an alternative, prior to the first performance of method step S3, it is also possible first to perform method step S4, i.e., optical coherence tomography, in order, for example, to analyze the starting material or to check the substrate alignment.

The two 3D printing methods 200, 400 elucidated with reference to FIG. 4A and FIG. 4B can also be combined with one another, i.e., method steps S3 and S4 can also be conducted partly simultaneously and partly in alternation with one another.

All the methods described hereinafter that include an analysis by optical coherence tomography were conducted with a 3D printing apparatus built in-house. Optical coherence tomography was effected here in the Fourier range using a radiation source having a central wavelength of 845 nm and a nominal full width at half maximum (FWHM) of 135 nm (fiber-coupled superluminescent diode, model: Exalos EXC250002-00), with which a measured axial resolution of 2.7 µm and a lateral resolution of 2.2 µm, and a maximum sensitivity of 105 dB are attained. The scan rate or A scan frequency was 25 kHz for each B scan (2D image formed from several A scans, i.e., individual depth signals or individual scans).

Figure 5:
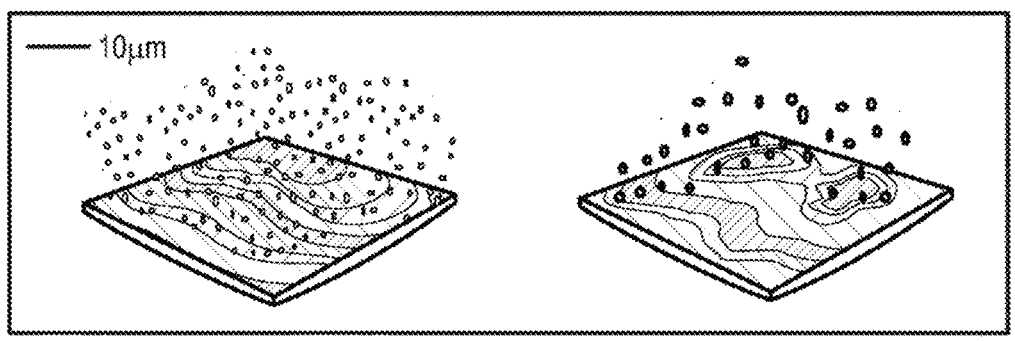
FIG. 5 shows an image for elucidation of an illustrative method of analysis of a quality of a starting material for nonlinear absorption polymerization.

With reference to FIG. 5, a method of analysis of the quality of a starting material for nonlinear absorption polymerization by optical coherence tomography is elucidated in detail hereinafter. In this method, a quality parameter of the starting material is ascertained by optical coherence tomography.

For quality analysis of the starting material, prior to commencement of nonlinear absorption polymerization, volumetric images are recorded by optical coherence tomography (3D OCT scans) and evaluated. In the course of the evaluation, one or more quality parameters are ascertained. These quality parameters may give information, for example, as to whether the 3D OCT scans and hence the starting material examined show impurities, the size of the fraction of impurities, the size and/or size distribution of the impurities, the distribution of the impurities within the starting material, etc. Moreover, it is also possible to ascertain the 3D coordinates of the impurities. The evaluation can be effected in a computer-assisted manner and optionally by artificial intelligence methods. Using this information, it is subsequently possible to assess the suitability of the starting material for the planned 3D printing method. This assessment too can be effected in a computer-assisted manner and optionally by artificial intelligence methods.

FIG. 5 shows 3D OCT scans, simplified in the form of black-and-white line drawings, of an aged starting material (on the left) and a fresh starting material (on the right). Both starting materials have been applied to a glass substrate for production of the 3D OCT scans.

In the case of the aged starting material (left-hand image), the presence of many microscale intrinsic inhomogeneities may be observed as contaminants, while the 3D OCT scan, simplified in the form of a black-and-white line drawing, of the fresh starting material (right-hand image) shows barely any contaminants. Depending on the demands made on the starting material, it is subsequently possible to assess whether, too, the aged starting material is still usable or should be discarded.

If the starting material analyzed as described above is used for 3D printing by nonlinear absorption polymerization, quality parameters ascertained in the quality analysis, for example the proportion and the 3D coordinates of the impurities, may be used for fixing and optimization of the nonlinear absorption polymerization parameters, for example what are called the laser writing parameters. In this way, it is possible to influence the morphology and properties of the workpieces manufactured. It is possible to obtain workpieces having improved quality.

It is also possible to recheck the volumes with contaminants that were analyzed prior to the nonlinear absorption polymerization after the nonlinear absorption polymerization, in order to assess the quality of the workpiece close to the impurities detected beforehand. In this way, it is possible to infer findings as to the effect on the quality of the workpiece manufactured as a result of the presence of contaminants. In other words, it is possible to conduct a quality analysis before, during and/or after nonlinear absorption polymerization.

Figure 6A:
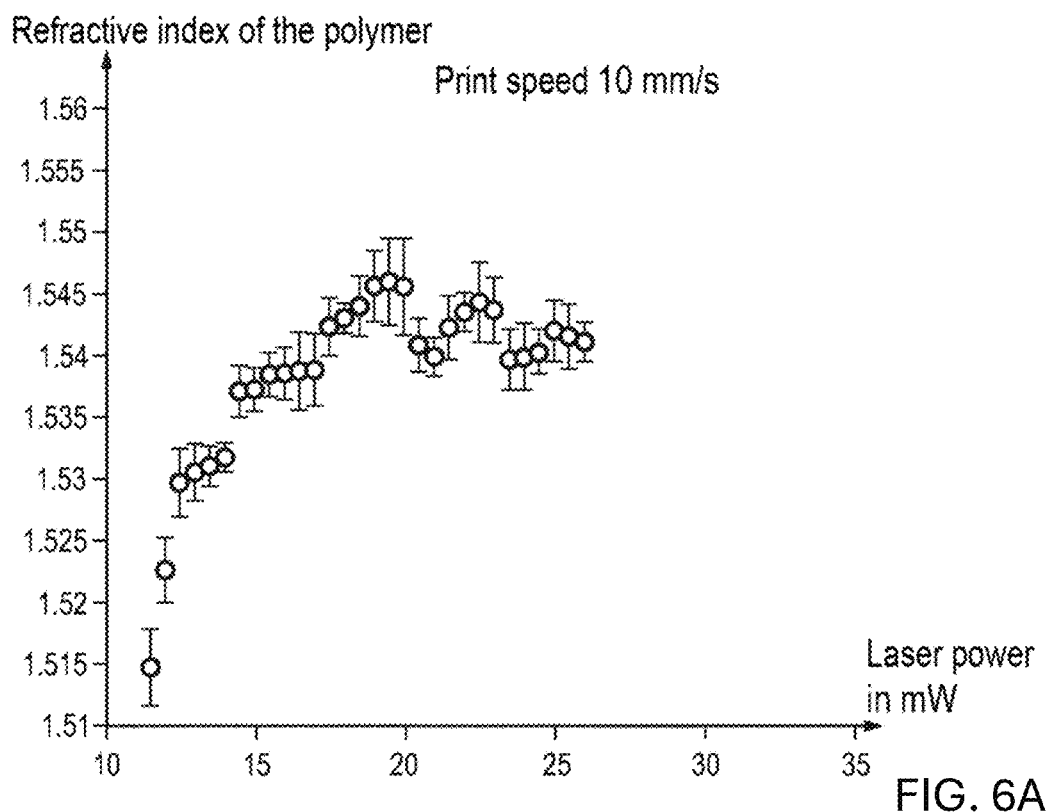
FIGS. 6A and B show images for elucidation of an illustrative method of ascertaining a degree of conversion in a nonlinear absorption polymerization.
Figure 6B:
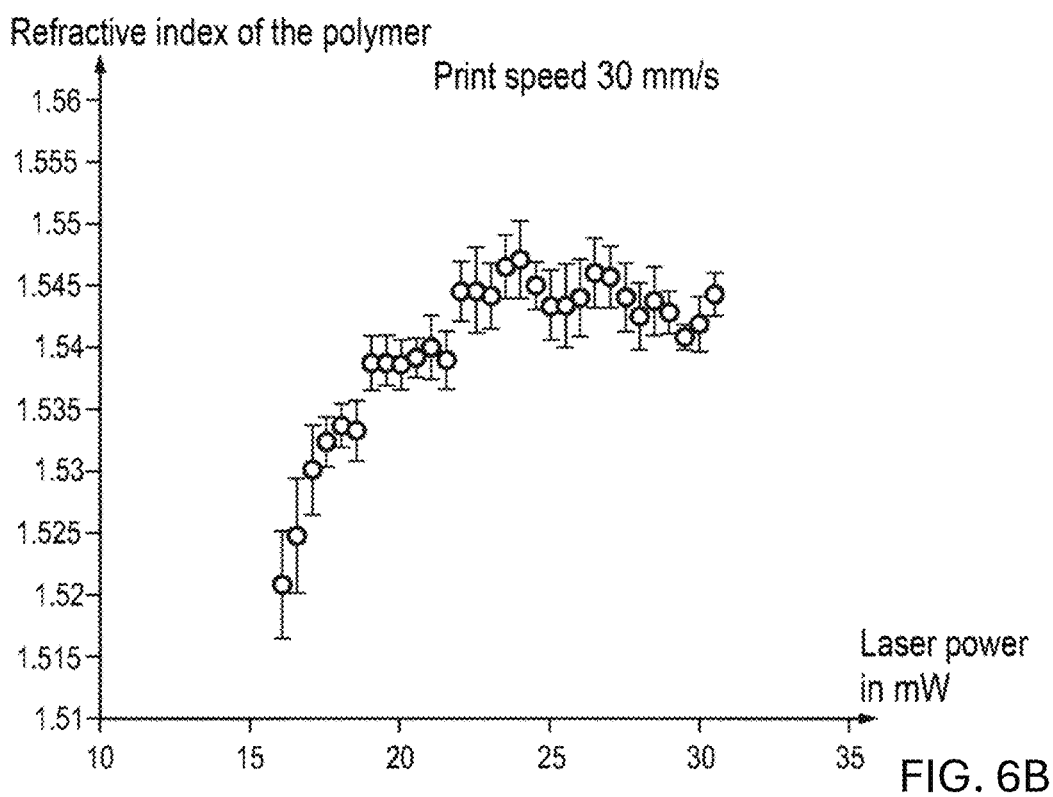

With reference to FIG. 6A and FIG. 6B, a method of ascertaining a degree of conversion in a nonlinear absorption polymerization by optical coherence tomography is elucidated in detail hereinafter.

The basic concept is to determine the degree of conversion from the refractive index. This is possible because polymerization increases the density of the material and hence causes the refractive index to rise. The local refractive index can be ascertained easily if it is assumed that the refractive index profile consists of abrupt jumps. In that case, if a refractive index is known, the other refractive index can be determined from the Fresnel reflection coefficients. At the interface to a glass substrate, for example, the refractive index of the glass substrate is known, and so the refractive index of the adjoining polymer or monomer can be determined.

The degree of conversion can therefore be ascertained in a spatially resolved manner in situ by optical coherence tomography, by detecting the optical coherence tomography signal that results from the reflection at the interface between polymer and substrate and first using this to determine the refractive index in a spatially resolved manner. FIGS. 6A and 6B show the influence of the power of the laser used for nonlinear absorption polymerization on the refractive index of the polymer created and hence the degree of conversion for a low print speed of 10 mm/s (FIG. 6A) and a high print speed of 30 mm/s (FIG. 6B). The refractive index was in each case determined in situ immediately after the laser irradiation by optical coherence tomography. The indicated error bars represent the standard deviation in six measurements that were conducted on six different samples with the same laser power at the same print speed.

A comparison of FIG. 6A and FIG. 6B shows that, in the case of a higher print speed, a higher laser power is required to attain the same refractive index. It is further apparent that, at a speed of 10 mm/s, the refractive index increases only insignificantly over and above a laser power of about 17.5 mW and therefore the maximum degree of conversion appears to have been attained. At a speed of 30 mm/s, this is the case only at a laser power of about 22.5 mW. For both speeds, the maximum achievable refractive index is roughly identical, such that it is possible in principle to achieve the maximum degree of conversion for both combinations of speed and laser power.

The degree of conversion ascertained in a spatially resolved manner can be included in fixing of the nonlinear absorption polymerization parameters. For example, when the degree of conversion is too low, the radiation power can be increased and/or the exposure time can be extended by reducing the print speed in order to achieve a higher degree of conversion. Since the degree of conversion can be determined in situ, the desired nonlinear absorption polymerization parameters can be discovered more quickly. It is thus advantageously possible to produce workpieces with higher quality within a shorter period of time.

Figure 7A:
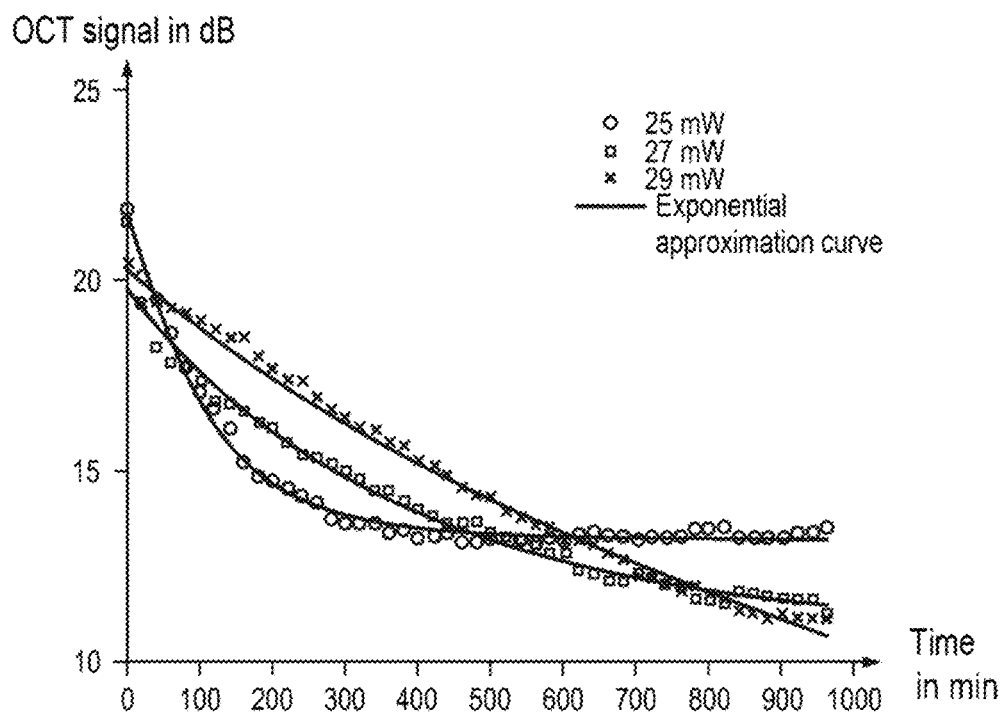
FIGS. 7A and B show images for elucidation of an illustrative method of analysis of a structure sharpness of structures created by nonlinear absorption polymerization.
Figure 7B:
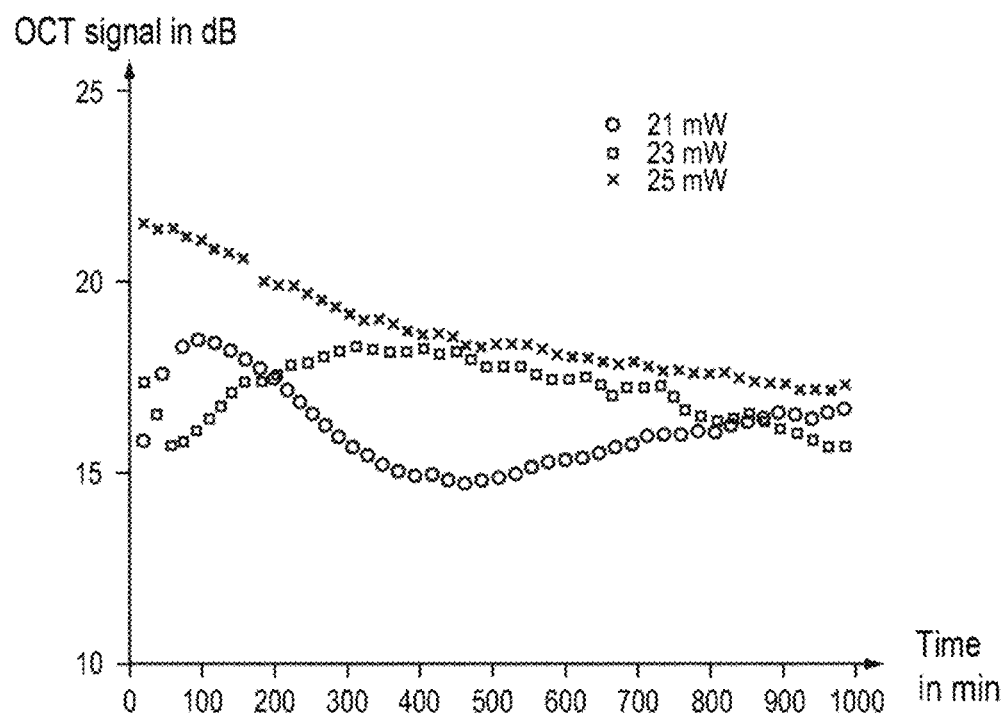

With reference to FIG. 7A and FIG. 7B, a method of analysis of structure sharpness of structures created by nonlinear absorption polymerization is elucidated in detail hereinafter.

In order to ascertain and assess the structure sharpness, volumetric images are recorded by optical coherence tomography (3D OCT scans) and evaluated. In the course of the assessment, an assessment is made of how abruptly the refractive index changes at characteristic points. If there is an abrupt change in refractive index, it can be concluded that structure sharpness is high. If, by contrast, there is only a gradual change in refractive index, the structure sharpness is low. The structure sharpness can be assessed and ascertained in a computer-assisted manner and optionally by artificial intelligence methods with reference to the spatially resolved refractive index progression ascertained by optical coherence tomography.

The optical coherence tomography signal is dependent on the refractive index profile between the unpolymerized and the polymerized starting material and is therefore affected by the presence of an interface between the unpolymerized and the polymerized starting material. Using optical coherence tomography scans at selected positions along the interface and at regular time intervals, it is possible to monitor the structure sharpness during the 3D printing operation.

FIG. 7A and FIG. 7B show illustrative measurement data for workpieces that have been printed with different laser powers and dipped into unpolymerized starting material. What is shown is the dependence on time of the OCT signal (optical coherence tomography signal) that has been recorded at the interface that forms between unpolymerized and the polymerized starting material. The OCT signal is plotted in the logarithmic unit of decibels (dB). FIG. 7A shows measurement data for a sample in which an already polymerized starting material has been immersed into liquid starting material after development thereof. FIG. 7B shows an in situ measurement in which a polymerized starting material has been left in the surrounding unpolymerized starting material during optical coherence tomography. FIG. 7A and FIG. 7B show measurement data for three different samples in each case, for which nonlinear absorption polymerization was effected with different laser powers—25 mW, 27 mW and 29 mW in FIG. 7A, and 21 mW, 23 mW and 25 mW in FIG. 7B. The starting material used in each case was the IP Dip® product from the manufacturer Nanoscribe GmbH. FIG. 7A and FIG. 7B show how the OCT signal decreases over time depending on the power of the writing laser. The following rule is applicable to the developed or polymerized structures (FIG. 7A): with rising laser power, there is a trend to the decrease in the exponential decay constant (flattening of the curve). This signal behavior is attributed by the inventors to the blurring of the refractive index transition between polymer matrix and monomer linked to diffusion processes. In FIG. 7B, no dependences of the OCT signal on the laser power are apparent. In this case, the diffusion probably has a more complex and stochastic character.

Figure 8A:
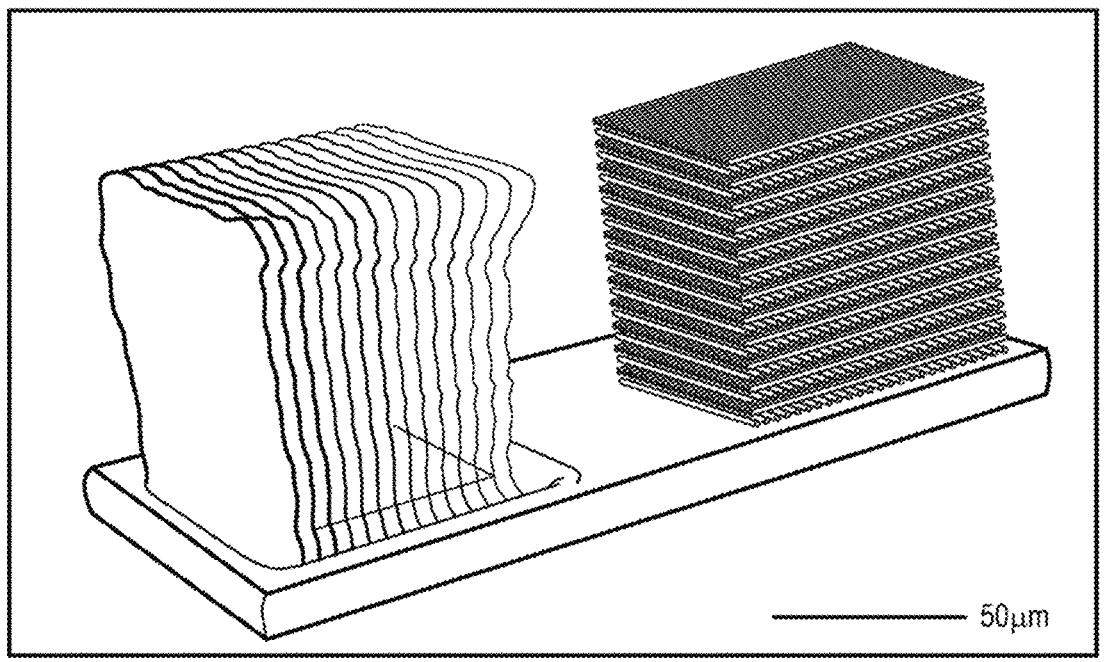
FIGS. 8A and B show images for elucidation of an illustrative method of three-dimensional reconstruction of a workpiece manufactured by nonlinear absorption polymerization.
Figure 8B:
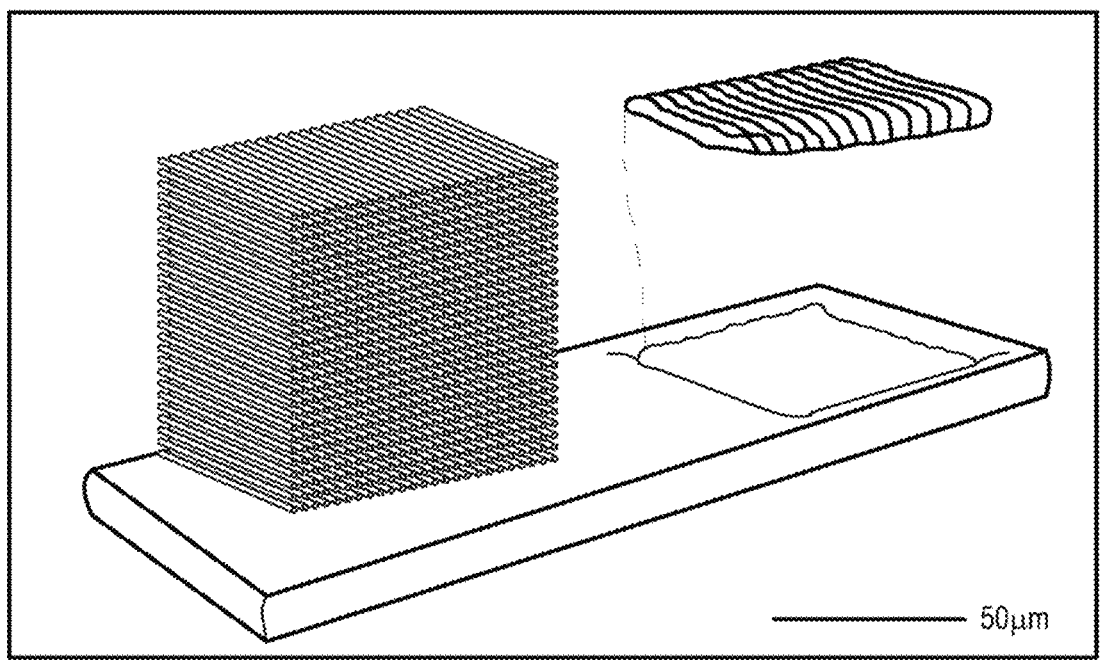

With reference to FIGS. 8A and 8B, a method of three-dimensional reconstruction of a profile of the radiation exposure of a starting material during a nonlinear absorption polymerization by optical coherence tomography is elucidated in detail hereinafter.

As already elucidated by way of introduction, known methods of reconstruction of morphologies after the 3D printing operation has ended assume imperfections in the printed workpiece that lead to inhomogeneities in the refractive index. FIG. 8A, left-hand image, shows a 3D OCT scan reconstruction of a workpiece manufactured by nonlinear absorption polymerization. The cross-hatching introduced in the course of manufacture, the model of which is shown in FIG. 8A, right-hand image, leads to an inhomogeneous refractive index within the workpiece manufactured, such that the reconstruction can be effected entirely using OCT scans conducted after the 3D printing.

By contrast, for example, vertical side walls between regions with a constant refractive index in sections do not lead to an optical coherence tomography signal if the radiation utilized for the optical coherence tomography is incident on the site of analysis from the top, i.e., parallel to the side wall. They can therefore be reconstructed only to a limited degree, if at all. FIG. 8B, right-hand image, shows a 3D OCT scan reconstruction of a workpiece manufactured by nonlinear absorption polymerization. The unidirectional hatch introduced in the course of manufacture, the model of which is shown in FIG. 8B, left-hand image, leads to a homogeneous refractive index within the workpiece manufactured. The vertical side walls therefore cannot be detected by OCT scans, and so the reconstruction can only be made incompletely using OCT scans conducted after the 3D printing.

The improved method proposed here for 3D reconstruction provides that OCT scans are conducted in situ, where sequences in which printing is effected by nonlinear absorption polymerization alternate with sequences in which an analysis is effected by optical coherence tomography. The respective OCT signal is generated here at the interface between materials with different refractive indices, for example at the interface between starting material having a low and higher degree of polymerization, provided that the refractive index difference is large enough to backscatter the light or the radiation. The change in position of the interface with progressive 3D printing can be followed by optical coherence tomography. Several individual OCT scans can ultimately be used to reconstruct the entire morphology of the workpiece manufactured.

This has the advantage that a comprehensive 3D reconstruction is possible even when the manufactured, i.e., finished, workpiece contains surfaces that do not create any discernible OCT signal.

The frequency of the OCT scans may be or have been fixed, for example depending on the printing time that has elapsed, i.e., the duration during which nonlinear absorption polymerization has been conducted. This has the advantage of simple metrological implementation.

It is optionally possible to optimize the frequency of the OCT scans, i.e., to match it to the specific printing situation, for example depending on the expected morphology of the workpiece according to the accompanying CAD model, the starting material, the radiation power, etc. Firstly, as many printed layers as possible should be imaged in order to reconstruct the printed workpiece with maximum accuracy. Secondly, the frequency of the OCT scans should be adjusted such that complete postpolymerization of the layers examined is possible, and disadvantageous delays in 3D printing are avoided.

One strategy may be to adjust the frequency of the OCT scans depending on the morphology to be imaged. For example, a large volume may be imaged all at once, for example for reconstruction of morphologies of inclined side walls relative to the incident radiation for performance of optical coherence tomography. For the reconstruction of elements, for example side walls, that cannot be imaged with a single OCT capture, i.e., of elements that are aligned in the direction of the incident radiation for performance of optical coherence tomography, it is possible to increase the frequency of the OCT scans.

The frequency of the OCT scans can be fixed, for example, using an analysis of the corresponding 3D (CAD) model prior to commencement of 3D printing and, if required, implemented in a control system for control of the 3D printing apparatus.

Figure 9:
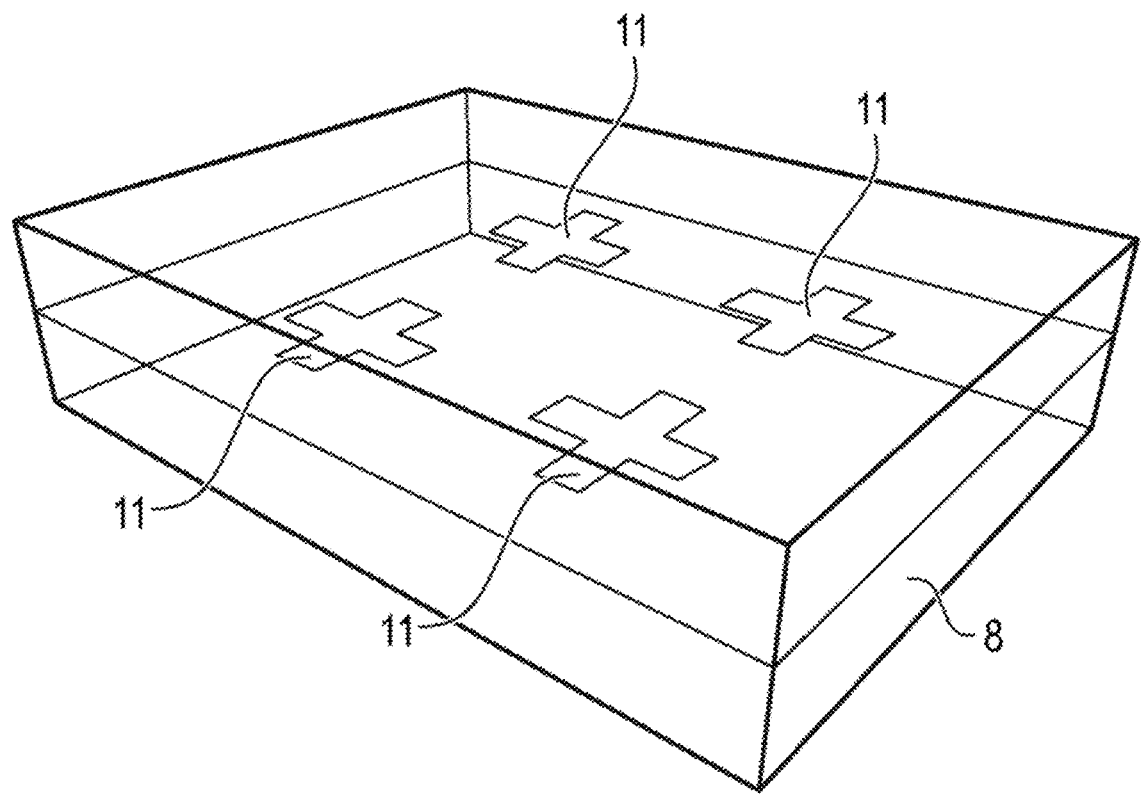
FIG. 9 shows an image for elucidation of an illustrative method of verifying the alignment of a substrate to be printed by nonlinear absorption polymerization.

With reference to FIG. 9, a method of verifying the position and/or alignment of a substrate 8 to be printed by nonlinear absorption polymerization is elucidated in detail hereinafter. FIG. 9 shows a transparent substrate 9 into which four cruciform characteristic markings 11 have been introduced. The position and alignment of the characteristic markings 11 with regard to the substrate 8 is known, and so the position and alignment of the substrate 8 can be ascertained by localization of the characteristic features 11.

For this purpose, one or more of the characteristic features 11 of the substrate 8 to be printed are identified by optical coherence tomography, i.e., using two- or typically three-dimensional OCT images.

The verification of the position and/or alignment by optical coherence tomography can be conducted inter alia in the cases described hereinafter.

When the substrate region to be printed cannot be imaged with a real-time camera of the 3D printing apparatus, for example when it is at an oblique side wall or when it is concealed, optical coherence tomography may be used in order to image the substrate region to be printed and to ascertain the corresponding coordinates, if appropriate also in relation to the section concealing the substrate region to be printed. This assumes that the coefficient of absorption of the material of the concealing section does not hinder the detection of the optical coherence tomography signal.

Optical coherence tomography can also serve for localization of characteristic features 11 that cannot be imaged with a real-time camera, either because of the alignment of the substrate 8 or the morphology of the already printed section, or because the characteristic features 11 are deliberately embedded in the interior of the substrate 8, for example characteristic features 11 in the form of alignment markings that have been written directly into the volume of a glass substrate with an fs laser, or alignment markings that have been written by nonlinear absorption polymerization and then concealed with another photoresist in order to create a refractive index contrast beneath the surface.

Since optical coherence tomography reacts very sensitively to contrasts in refractive index and enables the imaging beneath the surface of materials having low to moderate absorption and scatter, i.e., provided that the backscattered signal corresponds to the sensitivity of the OCT system, it is possible to use optical coherence tomography for the verification of the substrate position and/or substrate alignment within an arrangement of elements having identical topography that differ solely by the refractive index thereof as in the case of multimaterial printing, or by the internal structures thereof, for example elements having different porosity.

Once the substrate position and/or substrate alignment has been verified, it is possible to ascertain whether the substrate position and/or substrate alignment found corresponds to the desired substrate position and/or substrate alignment. If this is not the case, the position and/or alignment of the substrate 8 may thus be correspondingly altered and if appropriate verified once again by optical coherence tomography.

In addition to the appended claims, the disclosure can be defined by the following clauses:

Clause 14. A method of analyzing a quality of a starting material for a nonlinear absorption polymerization, wherein a quality parameter of the starting material is ascertained by optical coherence tomography.

Clause 15. The method as claimed in clause 14, wherein the method is conducted by means of a 3D printing apparatus (100, 300) as claimed in any of claims 1 to 12.

Clause 16. The method as claimed in clauses 14 or 15, wherein the optical coherence tomography is effected three-dimensionally.

Clause 17. The method as claimed in any of clauses 14 to 16, wherein parameters of the nonlinear absorption polymerization and/or parameters of the optical coherence tomography are fixed with reference to the quality parameter ascertained.

Clause 18. The method as claimed in clause 17, wherein the parameters of the nonlinear absorption polymerization are selected from a group comprising: laser power of the radiation used for the nonlinear absorption polymerization, trajectory and writing time.

Clause 19. The method as claimed in clauses 17 or 18, wherein the parameters of the optical coherence tomography comprise positions of the focal points of the radiation utilized for the optical coherence tomography and/or a trajectory for the focal point of the radiation utilized for the optical coherence tomography.

Clause 20. A method of verifying the position and/or alignment of a substrate to be printed by nonlinear absorption polymerization, wherein characteristic features (11) of the substrate to be printed are identified by optical coherence tomography.

Clause 21. The method as claimed in clause 20, wherein the method is conducted by means of a 3D printing apparatus (100, 300) as claimed in any of claims 1 to 12.

Clause 22. The method as claimed in clauses 20 or 21, wherein a focal point of a radiation utilized for the nonlinear absorption polymerization is matched to the verified position and/or alignment of the substrate to be printed.

Clause 23. A method of ascertaining a spatially resolved degree of conversion of a nonlinear absorption polymerization, wherein the degree of conversion is ascertained by optical coherence tomography.

Clause 24. The method as claimed in clause 23, wherein the method is conducted by means of a 3D printing apparatus (100, 300) as claimed in any of claims 1 to 12.

Clause 25. The method as claimed in clauses 23 or 24, wherein the optical coherence tomography is effected three-dimensionally.

Clause 26. The method as claimed in any of clauses 23 to 25, wherein parameters of the nonlinear absorption polymerization and/or parameters of the optical coherence tomography are fixed with reference to the degree of conversion ascertained.

Clause 27. The method as claimed in clause 26, wherein the parameters of the nonlinear absorption polymerization are selected from a group comprising: laser power of the radiation used for the nonlinear absorption polymerization, trajectory and writing time.

Clause 28. The method as claimed in clauses 26 or 27, wherein the parameters of the optical coherence tomography comprise positions of the focal points of the radiation utilized for the optical coherence tomography and/or a trajectory for the focal point of the radiation utilized for the optical coherence tomography.

Clause 29. A method of analyzing a structure sharpness of a structure generated by nonlinear absorption polymerization, wherein the structure sharpness is ascertained from a refractive index progression ascertained by optical coherence tomography.

Clause 30. The method as claimed in clause 29, wherein the method is conducted by means of a 3D printing apparatus (100, 300) as claimed in any of claims 1 to 12.

Clause 31. The method as claimed in clauses 29 or 30, wherein the optical coherence tomography is effected three-dimensionally.

Clause 32. The method as claimed in any of clauses 29 to 31, wherein parameters of the nonlinear absorption polymerization and/or parameters of the optical coherence tomography are fixed with reference to the structure sharpness ascertained.

Clause 33. The method as claimed in clause 32, wherein the parameters of the nonlinear absorption polymerization are selected from a group comprising: laser power of the radiation used for the nonlinear absorption polymerization, trajectory and writing time.

Clause 34. The method as claimed in clauses 32 or 33, wherein the parameters of the optical coherence tomography comprise positions of the focal points of the radiation utilized for the optical coherence tomography and/or a trajectory for the focal point of the radiation utilized for the optical coherence tomography.

Clause 35. The method as claimed in any of clauses 23 to 34, wherein the degree of conversion and/or the structure sharpness are ascertained in situ during the nonlinear absorption polymerization and parameters of the nonlinear absorption polymerization and/or parameters of the optical coherence tomography are controlled as a function of the degree of conversion ascertained and/or the structure sharpness ascertained.

Clause 36. A method of three-dimensional reconstruction of a workpiece manufactured by nonlinear absorption polymerization, wherein, during the manufacture of the workpiece, sequences in which printing is effected by nonlinear absorption polymerization alternate with sequences in which an analysis is effected by optical coherence tomography.

Clause 37. The method as claimed in clause 36, wherein the method is conducted by means of a 3D printing apparatus (100, 300) as claimed in any of claims 1 to 12.

Clause 38. The method as claimed in clauses 36 or 37, wherein a number and/or a juncture of the sequences in which an analysis is effected by optical coherence tomography is fixed depending on an expected morphology of the workpiece manufactured, of a starting material of the workpiece manufactured and/or parameters of the nonlinear absorption polymerization.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 1 first radiation source
2 first radiation
3 second radiation source
4 second radiation
5 first beam path
6 second beam path
7 focal point
8 substrate
9 optical system
10 input coupling element
11 characteristic feature
12 starting material
13 vessel
14 immersion liquid
15 first objective lens 16 second objective lens
17 mirror
18 objective lens
19 lens
20 galvanomirror, x direction
21 galvanomirror, y direction
22 fiber coupler
23 analysis unit
100 3D printing apparatus
200 3D printing method
300 3D printing apparatus
400 3D printing method
3D three-dimensional
CAD computer-aided design
CW continuous wave
NA numerical aperture
fs femtosecond
OCT optical coherence tomography
S1 providing a substrate
S2 positioning the substrate in the starting material
S3 performing a nonlinear absorption polymerization
S4 performing an optical coherence tomography
S5 washing out excess starting material
α angle at which the first radiation and the second radiation meet
ω opening angle of the second beam path

The invention claimed is:

1. A 3D printing apparatus for manufacture of a workpiece, the apparatus comprising:
a first radiation source configured to emit a first radiation for performance of a nonlinear absorption polymerization; and
a second radiation source configured to emit a second radiation for performance of an optical coherence tomography,
wherein a first beam path is traversable by the first radiation and a second beam path is traversable by the second radiation, and wherein the first beam path and the second beam path are formed entirely independently of one another.

2. The apparatus as claimed in claim 1, wherein the first beam path and the second beam path are formed such that the first radiation and the second radiation are incident on one another at an angle α, where 0°<α<180°.

3. The apparatus as claimed in claim 2, wherein α=90°−ω/2, where @ is an object-side opening angle of the second beam path.

4. The apparatus as claimed in claim 1, wherein the first beam path is formed such that the first radiation hits a substrate surface parallel to a normal of the substrate surface of a substrate to be printed.

5. The apparatus as claimed in claim 1, wherein the second beam path is formed such that the second radiation hits the substrate surface at a non-90° angle to the normal of the substrate surface of the substrate to be printed.

6. The apparatus as claimed in claim 5, wherein the second beam path is formed such that the second radiation hits the substrate surface at an angle of less than 90° to the normal of the substrate surface of the substrate to be printed.

7. The apparatus as claimed in claim 1, wherein the second beam path is formed such that the second radiation hits a focal point through the substrate to be printed.

8. A 3D printing apparatus for manufacture of a workpiece, the apparatus comprising:
a first radiation source configured to emit a first radiation for performance of a nonlinear absorption polymerization;
a second radiation source configured to emit a second radiation for performance of an optical coherence tomography,
wherein the first radiation source and the second radiation source are arranged such that an optical system is at least partly utilizable collectively by the first radiation and the second radiation;
an objective lens disposed in the optical system and configured to focus the first radiation and the second radiation to a focal point; and
an input coupling element configured to couple the first radiation and/or the second radiation into the optical system,
wherein the input coupling element is selected from the group consisting of a mechanically adjustable mirror, a galvanomirror, a polarizing beam divider, an intensity divider, and a partly coated mirror.

9. The apparatus as claimed in claim 8, further comprising:
an analysis unit, set up and configured to generate optical coherence tomography images based on the second radiation, wherein the analysis unit has multiple measurement channels such that multiple analysis sites can be analyzed simultaneously by the optical coherence tomography.

10. The apparatus as claimed in claim 8, wherein the second radiation source emits a wave which is constant over time as the second radiation.

11. The apparatus as claimed in claim 8, further comprising:
a vessel for positioning of a starting material to be polymerized, wherein the vessel is configured to be at least partly transparent to the first radiation and/or the second radiation.

12. The apparatus as claimed in claim 8, wherein the objective lens of the apparatus is configured and arranged such that the objective lens can be immersed into the starting material to be polymerized.

13. A 3D printing method for manufacture of a workpiece with an apparatus as claimed in claim 8, wherein the nonlinear absorption polymerization and the optical coherence tomography are conducted in mutual alternation or simultaneously.

14. The apparatus as claimed in claim 2, wherein the first beam path and the second beam path are formed such that the first radiation and the second radiation are incident on one another at the angle α, where 0°<α>90°.

* * * * *

UNITED STATES PATENT AND TRADEMARK OFFICE
CERTIFICATE OF CORRECTION

| | |
|---|---|
| PATENT NO. | : 12,319,000 B2 |
| APPLICATION NO. | : 18/820596 |
| DATED | : June 3, 2025 |
| INVENTOR(S) | : Guillaume Gomard et al. |

Page 1 of 1

It is certified that error appears in the above-identified patent and that said Letters Patent is hereby corrected as shown below:

On the Title Page

In Item (30) Foreign Application Priority Data, please add:
-- Mar. 1, 2022 (DE) ..................... 102022104797 --

In Item (56) Other Publications, Publication No. 20:
Change "Office Action by the Chinese Patent Office (SIPO) issued in Cn 202380025017.X" to
-- Office Action by the Chinese Patent Office (SIPO) issued in CN 202380025017.X --

In the Specification

In Column 10, Line 65:
Change "evaluatable" to -- evaluable --

In the Claims

In Column 33, Line 47, Claim 3:
Change "@" to -- ω --

Signed and Sealed this
Fifteenth Day of July, 2025

Coke Morgan Stewart
*Acting Director of the United States Patent and Trademark Office*